(12) United States Patent
Gienger

(10) Patent No.: US 11,752,623 B2
(45) Date of Patent: Sep. 12, 2023

(54) SIMULATING TASK PERFORMANCE OF VIRTUAL CHARACTERS

(71) Applicant: Honda Research Institute Europe GmbH, Offenbach/Main (DE)

(72) Inventor: Michael Gienger, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 253 days.

(21) Appl. No.: 17/216,702

(22) Filed: Mar. 30, 2021

(65) Prior Publication Data
US 2022/0314437 A1    Oct. 6, 2022

(51) Int. Cl.
*B25J 9/16*      (2006.01)
*G05B 17/02*      (2006.01)

(52) U.S. Cl.
CPC .......... *B25J 9/1605* (2013.01); *B25J 9/1607* (2013.01); *B25J 9/1664* (2013.01); *G05B 17/02* (2013.01)

(58) Field of Classification Search
CPC ...... B25J 9/1605; B25J 9/1607; B25J 9/1664; B25J 9/1682; B25J 9/0087; B25J 9/1671; B25J 9/043; B25J 9/0084; G05B 17/02; G05B 2219/40307; G05B 2219/40313; G05B 2219/40316; G05D 2201/0217
See application file for complete search history.

(56) References Cited

U.S. PATENT DOCUMENTS

2006/0293790 A1* 12/2006 Gienger ................ B25J 9/1643
700/245

2016/0257000 A1* 9/2016 Guerin ................ B25J 9/1671
(Continued)

FOREIGN PATENT DOCUMENTS

EP      1728600      3/2008

OTHER PUBLICATIONS

Raessa, Mohamed, et al. "Human-in-the-Loop Robotic Manipulation Planning for Collaborative Assembly." IEEE Transactions on Automation Science and Engineering, vol. 17, No. 4, Oct. 2020, pp. 1800-1813 (Year: 2020).*

(Continued)

*Primary Examiner* — Adam R Mott
*Assistant Examiner* — Matthew C Gammon
(74) *Attorney, Agent, or Firm* — JCIPRNET

(57) ABSTRACT

A method and simulation system for controlling at least one effector trajectory for solving a predefined task by at least one virtual effector. The method includes acquiring a sequence of postures to modify at least one of a contact constraint topology and an object constraint topology, generating a set of constraint equations based on at least one of the modified contact constraint topology and the modified object constraint topology, performing constraint relaxation on the generated set of constraint equations to generate a task description including the relaxed set of constraint equations, generating the effector trajectory by applying a trajectory generation algorithm on the generated task description, performing an inverse kinematics algorithm on the generated effector trajectory for generating a control signal, outputting the control signal to an output device, and generating, by the output device, image information displaying the effector trajectory of the virtual effector based on the control signal.

14 Claims, 8 Drawing Sheets

(56) References Cited

U.S. PATENT DOCUMENTS

2018/0088538 A1* 3/2018 Tian .................. G05B 23/0297
2021/0183541 A1* 6/2021 Mitchell .......... H01B 13/01209

OTHER PUBLICATIONS

Bouyarmane, K., Caron, S., Escande, A., Kheddar, A. (2019). Multi-contact Motion Planning and Control. In: Goswami, A., Vadakkepat, P. (eds) Humanoid Robotics: A Reference. Springer, Dordrecht. (Year: 2019).*

Adrien Escande et al., "Planning support contact-points for acyclic motions and experiments on HRP-2," Experimental Robotics, Jul. 2008, pp. 1-15.

Allison M. Okamura et al., "An overview of dexterous manipulation," Proceedings 2000 ICRA. Millennium Conference. IEEE International Conference on Robotics and Automation. Symposia Proceedings (Cat. No.00CH37065), vol. 1, Apr. 2000, pp. 1-8.

Michael Gienger et al., "Human-robot cooperative object manipulation with contact changes," 2018 IEEE/RSJ International Conference on Intelligent Robots and Systems (IROS), Oct. 2018, pp. 1-8.

Changhyun Sung et al., "Task-dependent distribution and constrained optimization of via-points for smooth robot motions," 2015 IEEE International Conference on Robotics and Automation (ICRA), Jun. 2015, pp. 1-8.

S. Chiaverini et al., "Review of the damped least-squares inverse kinematics with experiments on an industrial robot manipulator," IEEE Transactions on Control Systems Technology, vol. 2, Jul. 1994, pp. 1-13.

Wichael Gienger et al., "Exploiting task intervals for whole body robot control," 2006 IEEE/RSJ International Conference on Intelligent Robots and Systems, Oct. 2006, pp. 1-7.

Hisashi Sugiura et al., "Real-time self collision avoidance for humanoids by means of nullspace criteria and task intervals," 2006 6th IEEE-RAS International Conference on Humanoid Robots, Jan. 2007, pp. 1-7.

Dmitry Berenson et al., "Pose-constrained whole-body planning using task space region chains," 2009 9th IEEE-RAS International Conference on Humanoid Robots, Dec. 2009, pp. 1-7.

Michael Gienger et al., "Task maps in humanoid robot manipulation," 2008 IEEE/RSJ International Conference on Intelligent Robots and Systems, Sep. 2008, pp. 1-7.

Alain Liegeois, "Automatic supervisory control of the configuration and behavior of multibody mechanisms," IEEE Transactions on Systems, Man, and Cybernetics, vol. 7, Dec. 1977, pp. 868-871.

* cited by examiner

FIG. 8B  ⇩ CONNECT CONTACT

FIG. 8C  ⇩ CONNECT CONTACT

SIMULATING TASK PERFORMANCE OF VIRTUAL CHARACTERS

TECHNICAL FIELD

The invention relates to the field of motion simulation for virtual characters, in particular multi-contact motion simulation methods and corresponding motion planning systems. A method and system for motion simulation for robot control and realistic character animation are proposed.

BACKGROUND

Simulating a behavior of virtual characters in computer-based animation extends far beyond the field of entertainment. Virtual characters may impersonate humans, e.g. human worker, or any type of robots, e.g. industrial robots or humanoid robots. For example, training videos created by animating virtual workers enable human workers to train steps for manipulating a physical object in order to perform a predefined task in a specific environment. Simulated motion of virtual workers or virtual robots may not only apply for creating training videos running on displays, but could also form a basis for display in virtual reality/augmented reality devices, in workspace design tools, or in the field of computer gaming, which represents a rapidly growing field of application involving increasing sale revenues. A basis for simulating the behavior of virtual characters form algorithms for multi-contact motion planning.

Multi-contact motion planning may be described as the problem of finding a contact sequence and a virtual character motion for performing movement tasks with changing contacts between the virtual character and physical structures in the environment. Movement tasks of a virtual character include walking gait patterns for mobile robots, referring to contacts between ground environment and movement means ("feet") of the robot. For determining a walking gait pattern, a sequence of contacts between feet of the robot and the ground environment needs to be determined.

A further example is manipulation planning. For manipulating a physical object in the environment of the virtual character, a sequence of contacts of at least one end-effector ("manipulator", "hand", "finger") of the virtual character with the object has to be determined.

Determining solutions for problems of multi-contact motion planning requires ample computation resources. Presently, there exists no optimal solution for addressing tasks in the field of multi-contact motion planning. A known strategy for addressing such tasks includes breaking down the task into subtasks, and subsequently solving each subtask separately.

Publication "Planning support contact-points for acyclic motions and experiments on HRP-2", by Adrien Escande, Abderahmane Kheddar, Sylvain Miossec, and Sylvain Garsault, in: Experimental Robotics. Springer, Berlin, Heidelberg, 2009, discloses an approach for contact before motion planning for humanoid robots that enables addressing the task of finding a path for a mobile robot in a constrained environment.

According to the known strategy for addressing such tasks, the problem of multi-contact motion planning may be divided into subtasks of searching for contact candidates (step 1)

A geometric analysis of the operating space of the virtual character may be used for generating the contact candidates for a multi-contact locomotion task of the virtual character.

searching a contact sequence from the contact candidates of step 1 and estimating corresponding contact poses of the virtual character (step 2)

A potential-field based approach may be used to search for the sequence of contacts and for estimating the corresponding contact poses.

optimizing a trajectory between the contact poses of step 2 (step 3)

The trajectory optimization connects the contacts of the contact sequence by connecting the corresponding contact poses of the virtual character.

Separating the problem into subtasks may results in a computationally more manageable problem. Nevertheless, a major drawback of this approach is the loss of the interdependencies between the individual computation steps: The search for the contact sequence and pose estimation of step 2 bases on the results of step 1. Consequentially, in step 2, the contact candidates of step 1 are not adapted in step 2. Similarly, optimized trajectories determined in step 3 connect the contact poses estimated in step 2, and achieve only limited adaptation of locations of the contacts of the contact sequence, if any at all. Adapting of contact poses for a given contact between step 3 and step 2 are typically performed using techniques known in the art under the term "Inverse Kinematics".

Presently motion planning for sequential tasks is a challenging subject. One of the key aspects is to determine a feasible contact situation between the virtual character and the physical object and/or physical structures in the environment of the virtual character, so that successive steps in the sequence do not exceed physical limits of the virtual character. Physical limits for virtual characters may include feasible limits of human joints, for example. The physical limits may originate from the technical documentation of a specific type of robot.

Often exists an interdependence between the successive steps of the sequence. For example, considering a sequence of poses performed by a virtual character, initially grasping a large object with hands using a comfortable pose may result subsequently in a time series of inconvenient poses by the virtual character, for instance when the task of moving the object and simultaneously turning the object while continuously maintaining contact between hands of the virtual character and the object is executed. Inconvenient poses may include poses that when performed in in real world, would be inconvenient for a human, may involve heavy load on a spine of a human, for example. Alternatively or additionally, inconvenient poses may lead to instability of a robot, or merely suffer from high power consumption during transition from one step to the next step in the sequence of poses by the robot, for example.

The problem of determining contact and object poses in a sequential task of multi-contact motion planning in an efficient manner while overcoming the problems discussed above may be improved.

SUMMARY

A method for controlling at least one effector trajectory for solving a predefined task by a at least one virtual effector according to a first aspect, a non-transitory computer-readable storage medium embodying a program according to a second aspect, and a corresponding motion planning system according to a third aspect address the problem.

A method for controlling at least one effector trajectory for solving a predefined task by at least one virtual effector according to the first aspect starts with a step of acquiring a sequence of postures, each posture including at least one contact point and a kinematic pose of the at least one virtual effector. The method proceeds by modifying at least one of a contact constraint topology and an object constraint topology according to the acquired sequence of postures; then a set of constraint equations based on at least one of the modified contact constraint topology and the modified object constraint topology is generated. On the generated set of constraint equations, a constraint relaxation is performed to generate a task description including the set of relaxed constraint equations. Then at least one effector trajectory by applying a trajectory generation algorithm on the generated task description is generated. The method proceeds by performing an inverse kinematics algorithm on the generated at least one effector trajectory for generating a control signal. The control signal is then output to an output device, and the output device generates image information displaying the at least one effector trajectory of the virtual effector of the virtual character based on the control signal.

According to the second aspect, a non-transitory computer-readable storage medium embodying a program of machine-readable instructions executable by a digital processing apparatus cause the digital processing apparatus to perform operations according to the first aspect addresses the problem.

A simulation system for controlling at least one effector trajectory for solving a predefined task by at least one virtual effector comprises an acquisition unit, a processor and an output controller. The acquisition unit is configured to acquire a sequence of postures, each posture including at least one contact point and a kinematic pose of the at least one virtual effector. The processor is configured to modify at least one of a contact constraint topology and an object constraint topology according to the acquired sequence of postures. The processor is further configured to generate a set of constraint equations based on at least one of the modified contact constraint topology and the modified object constraint topology, to perform constraint relaxation on the generated set of constraint equations to generate a task description including the relaxed set of constraint equations, to generate the at least one effector trajectory by applying a trajectory generation algorithm on the generated task description. The processor is further configured to perform an inverse kinematics algorithm on the generated at least one effector trajectory for generating a control signal; and to output the control signal to the output controller. The output controller of the simulation system is configured to control output of image information displaying the at least one effector trajectory of the virtual effector by a display device based on the control signal.

BRIEF DESCRIPTION OF THE DRAWINGS

Embodiments of the invention are explained in more detail with reference to the drawings.

FIG. 8B shows a sequence model of the manipulation scenario according to FIG. 8A comprising a sequence of postures without coupling of consecutive steps.

FIG. 8C shows a sequence model of the manipulation scenario according to FIG. 8A comprising a sequence of postures with coupling of fixed contacts of the consecutive steps.

Figure 1:
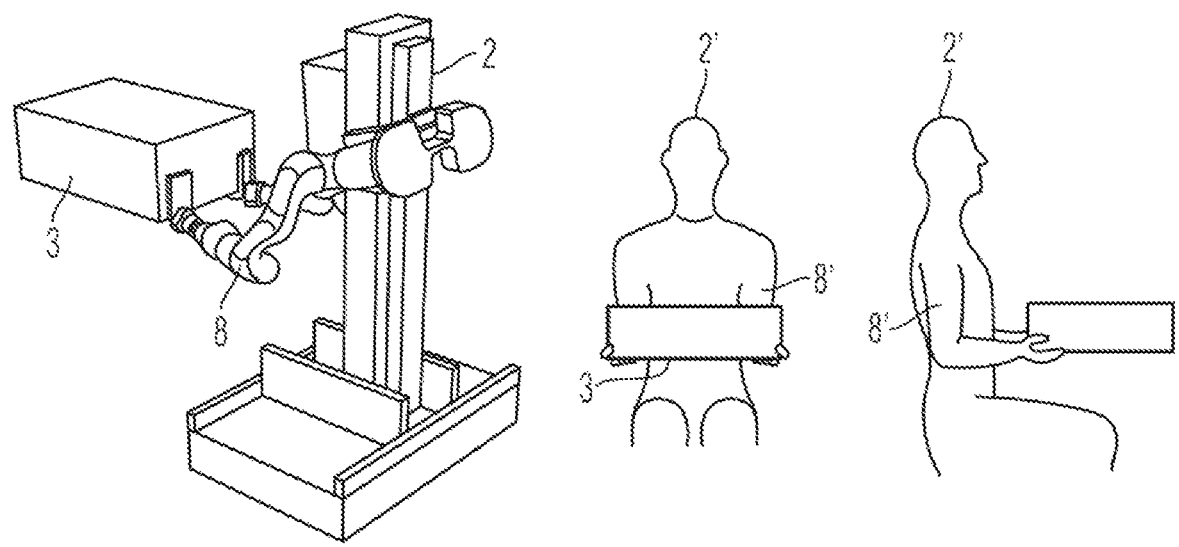
FIG. 1 illustrates an object-manipulation scenario involving a virtual character as an exemplary application of an embodiment.

Same or corresponding features are denoted in the figures by same reference signs. The description uses terms known in the art of robotics. For convenience, some short references are provided before discussing examples of the invention in more detail with reference to the drawings.

DETAILED DESCRIPTION

The term "constraint" refers to a particular constraint condition in the sequence of postures. The sequence of postures is modelled as a multibody system. The constraint condition implies a restriction in the kinematic degrees of freedom of one or more bodies. The degrees of freedom denote the number of independent kinematic possibilities of moving, For example, degrees of freedom correspond to the minimum number of parameters required to define the position of the object in space. A body is a rigid or flexible part of a mechanical system, for example, the effector of robot. A link is the connection of two or more bodies, or a body with the ground. The link is defined by kinematical constraints that restrict the relative motion of the bodies. The constraint condition may be an algebraic equation that defines the relative translation or rotation between two bodies. In the particular case of the contact constraint, the relative translation is zero.

An original set of constraint equations comprises the contact constraint topology, the object constraint topology and task constraints and represents. The generated set of constraint equations, which is generated based on at least one of the modified contact constraint topology and the modified object constraint topology and after performing constraint relaxation can have either have a same size as the original set of constraint equations, or a reduced size compared to the original set of constraint equations. The same size applies in a case, in which constraints of a current posture are changed to refer to the previous posture, but a dimension of the constraints is the same. The reduced size applies in a case, in which constraints of a current posture are removed during performing constraint relaxation.

The method according to the first aspect invention determines virtual character-to-object or virtual character-to-environment contacts while taking an overall sequence of postures into account. The method performs a computationally efficient contact pose adaptation for the overall contact sequence based on an overall optimality criterion. Comparing the method with the known approach discussed above, the approach adds an additional computation step, such that the concept reads contact before motion planning (step 1)
    searching a contact sequence and estimating corresponding contact pose (step 2)
    adapting sequence-optimal contact pose (step2A)
    optimizing a trajectory between adapted contact poses (step 3)

The new step 2A allows to compute virtual character motions that will not be found with using the state-of-the art approach. Consequentially, motions of the virtual character having a higher quality may be determined. Motions of a higher quality may include, for example, motions of effectors of the virtual character that show increased distance to joint range limits or reliably avoid collisions with objects or physical structures in the virtual environment. The approach according to the method eases the use of planning algorithms in step 1, since a user of the method is not required to fine-tune a contact situation in more detail himself. Further, the method may provide an optimized trajectory orders of magnitudes faster when compared with traditional trajectory optimization algorithms.

Currently, there exists no concept to perform pose adaptation under consideration of an overall contact sequence.

The method enables determining a sequence of optimal virtual character contacts and object poses for tasks that comprise a sequence of object handling steps. The object may move between individual steps. The method can also determine sequences comprising object handling steps, which include decision steps for deciding between alternate options how to proceed in the sequence. These sequences including one or more decision steps may be formulated as graphs. The method enables adjusting object constraints and contact constraints to optimize a global criteria function, while maintaining constraints consistent that do not change in the sequence at a consistent fixed pose. The scheme implemented by the method allows an implementation of a plurality of object handling scenarios for a virtual character, ranging from simulating assembly tasks at a workplace to human-robot collaborative tasks.

Known methods such as trajectory optimization (TO) deal exclusively with linear sequences of postures, and not apply on graph-structures that branch into different options. Furthermore, trajectory optimization requires more specifications for formulating the task: a trajectory representation, time-points, and other details such as criteria functions that determine a motion behavior when transitioning from one posture (step) to another posture (step) in the sequence of postures.

Contrary thereto, the proposed method is computationally more efficient and requires less specifications for describing the task. In addition, the method may be applied in a plurality of use cases that currently cannot be realized with trajectory optimization methods. For example the method may be advantageously employed when considering several options for addressing the task, or in an interactive simulation how to approach the task.

The method is not limited to a particular contact sequence domain. The method may, for example, be applied to walking gait patterns of mobile robots, or to manipulation sequences and similar tasks in the field of robotics and virtual character animation.

The method for controlling at least one effector trajectory for solving a predefined task by a at least one virtual effector according to the first aspect starts with a step of acquiring a sequence of postures, each posture including at least one contact point and a kinematic pose of the at least one virtual effector. The method proceeds by modifying at least one of a contact constraint topology and an object constraint topology according to the acquired sequence of postures; then a set of constraint equations based on at least one of the modified contact constraint topology and the modified object constraint topology is generated. On the generated set of constraint equations, a constraint relaxation is performed to generate a task description including the relaxed set of constraint equations. Then at least one effector trajectory by applying a trajectory generation algorithm on the generated task description is generated. The method proceeds by performing an inverse kinematics algorithm on the generated at least one effector trajectory for generating a control signal. The control signal is then output to an output device, and the output device generates image information displaying the at least one effector trajectory of the virtual effector of the virtual character based on the control signal.

The method according to an advantageous embodiment comprises in the step of modifying the contact constraint topology, in case a contact location in the object frame of a current posture in the sequence of postures remains the same as a contact location of the corresponding contact in an immediately preceding posture of the sequence of postures, a step of removing a constraint of the contact to the object in the current posture, and a step connecting a new constraint of the contact in the current posture to the corresponding contact in at least one immediately preceding posture of the sequence of postures.

According to an embodiment of the method for controlling at least one effector trajectory, the step of modifying the object constraint topology comprises, in case an object pose of the current posture in the sequence of postures remains the same as the object pose in an immediately preceding posture of the sequence of postures, a step of removing a constraint of the object in the current posture, and a step of connecting a new constraint of the object in the current posture to the corresponding object in at least one immediately preceding posture of the sequence of postures. For example, the step of removing a constraint of the object in the current posture removes a constraint with respect to a reference frame.

The sequence of postures may be a linear sequence, or alternatively, the sequence of postures may have a graph structure modelling at least two alternate options for performing a task by controlling the at least one effector trajectory. The discussed example of the algorithm "connect contacts" regards a sequence of postures with an exclusively sequential structure. Alternatively or additionally, a particular example of the sequence of postures may have a structure including closed chain of postures. In a sequence of postures representing a closed chain of postures, constraints of a first posture in the sequence of postures are connected to a last posture of the sequence of postures. The graph structure may have, for instance, a tree structure (trees of postures), a closed chain structure, or a directed acyclic graph structure. A closed chain of postures is a graph structure in which a first posture of the sequence of postures connects to a last posture of the sequence of postures. The sequence of postures having a graph structure includes at least two individual postures, which the sequence arranges for execution at a corresponding point in time. The at least two individual postures, which the sequence arranges for execution at a corresponding point in time represent postures to be performed alternatively for performing the predefined task.

According to an embodiment of the method for controlling at least one effector trajectory, performing constraint relaxation on the generated set of constraint equations comprises at least one of regularizing at least one individual constraint by allowing a deviation from the individual constraint, removing at least one constraint which is invariant for the task, and removing at least one constraint in case a value of the constraint coordinate is within a predetermined interval.

Each contact (contact point) may be modelled in a kinematic chain in an environment via an object coordinate frame of the object (virtual object) in the environment (virtual environment). Each contact, may, for example be modelled in the kinematic chain to a reference frame in the environment of the robot.

Each individual posture of the acquired sequence of postures (initial sequence of postures) may be independent of other postures of the acquired sequence of postures (initial sequence of postures).

The method for controlling at least one effector trajectory according to an embodiment may comprise varying the cost function to generate differing at least one effector trajectories by repeatedly executing the method, and computing a criteria function for each generated at least one effector trajectory.

The method for controlling at least one effector trajectory according to an embodiment may comprise the criteria function as a function corresponding to a human ergonomic function, such as a load curve on a human spine. The method may then be used to determine a sequence of postures with good ergonomics based on the human ergonomic function in order to provide ergonomically positive postures. Alternatively or additionally, the method may then be used to determine a sequence of postures which are to be avoided for ergonomic reasons based on the human ergonomic function in order to provide ergonomically negative postures as examples.

Introducing the criteria function as a function of human ergonomics, and changing this criteria function between simulation runs enables a user of the method to understand, which postures are advantageous and which postures are to be avoided. The user may deduce therefrom how, e.g. using which postures in what time sequence, to address the predefined task.

The method for controlling at least one effector trajectory according to an embodiment includes outputting, via a user interface, at least one value for a parameter of the criteria function.

The method for controlling at least one effector trajectory according to an embodiment includes generating and outputting, via a user interface, a video sequence configured to display the at least one trajectory.

Outputting a video sequence displaying the trajectory in an animated form enables a user to benefit from the generated sequence of postures optimized according to the cost function.

The method for controlling at least one effector trajectory may control the virtual effector in real-time.

The method may comprise a step of adjusting the effector trajectory of the virtual character to match a quality function. The quality function includes a description of a human ergonomic state determined based on a given ergonomic model of a human acting as a collaborative partner of the virtual character, and the adjusted effector trajectory defines an effector-and-object pose of the virtual character.

The method may comprise in the step of performing a constraint relaxation on the generated set of constraint equations, relaxing at least a constraint equation on a location of the virtual character. The method further comprises a step of determining an optimized location of the virtual character for performing the predefined task.

The method may include performing the method for solving a predetermined task with each of at least two different virtual characters. The method proceeds by performing a step of determining which of the at least two different virtual characters is more suitable by comparing quality criteria for performing the task by each of the at least two different virtual characters.

According to an embodiment of the method for controlling at least one effector trajectory, in the step of acquiring the sequence of postures, the acquired sequence of postures solves the predefined task. In the step of performing a constraint relaxation on the generated set of constraint equations, at least a constraint equation on at least one location of a tool or object required for solving the task is relaxed, and the method further comprises a step of determining at least one optimized location of the tool or object for designing a workplace within an environment for performing the task.

Thus, the method enables to design or to adapt the design of the workplace of the worker to at least one of his individual ergonomic requirements, and a specific predefined task to be performed at this workplace.

The sequence of postures may have a graph structure (tree structure) that models at least two alternate options for performing a task by controlling the at least one effector trajectory. The method according to the embodiment is executed as part of an online receding horizon planning method.

The method may generate the at least one effector trajectory as optimal with respect to one of the at least two alternate options. Alternatively the method generates the effector trajectory as optimal with respect to a weighted average of the two alternate options.

The method for controlling at least one effector trajectory comprises acquiring a plurality of sequences of postures for performing one task, wherein individual sequences of postures of the acquired plurality of sequences of postures differ by the number of postures included in the respective sequence of postures. The method performs the method for each individual sequence of postures of the acquired plurality of sequences of postures, and discards individual sequences of postures, which result in a corresponding effector trajectory that violates at least one motion limit of a particular virtual character.

The method for controlling at least one effector trajectory may be performed for controlling legs of a multi-legged virtual character by optimizing leg effector trajectories of the legs to generate a multi-limb locomotion pattern of the multi-legged mobile virtual character.

The term configuration refers to a minimal coordinate representation of the kinematics of a robot 2 and a physical entities for a single point in time.

The term posture refers to a kinematic arrangement of a set or a tree of rigid bodies according to a given configuration.

A posture sequence denotes a time-ordered sequence of configurations.

Degrees of freedom (sometimes used in abbreviated form as dof) denote actuated and non-actuated variables that constitute the movement possibilities of a kinematic model.

The configuration space is a vector comprising all degrees of freedom. The configuration space is typically referred to as vector q.

A pose is a spatial description of a rigid body with six degrees of freedom (position and orientation).

The approach of receding horizon control denotes a computational strategy to re-compute the solution to a task while a system is addressing the task.

The subsequent description of an advantageous embodiment employs the following assumptions:

The sequential task effects a movement of one or several objects 3. The one or several objects 3 is/are manipulated with one or several end-effectors 9 (manipulators) of a robot 2 and/or human hands. The embodiment addresses in particular the problem of finding contact locations and object poses within the sequential task. The embodiment bases on the concept of dexterous manipulation, which uses an object-centered description. Okamura, Allison M., Niels Smaby, and Mark R. Cutkosky provide in "An overview of dexterous manipulation" in: Proceedings 2000 ICRA. Millennium Conference. IEEE International Conference on Robotics and Automation. Symposia Proceedings (Cat. No. 00CH37065). Vol. 1. IEEE, 2000, a description of this concept, in which multiple effectors 8 of a robot 2 cooperate in order to address the task of grasping objects 3 and manipulating objects 3.

The method relies on rigid body kinematics and is suited to redundant systems, which in present context means kinematic models which have more degrees of freedom than kinematic constraints.

An initial sequence of postures for addressing a task has already been computed using a generally known methods, e.g. with one of the below mentioned state-of-the-art approaches. For example, a motion planning algorithm decomposes the task into a sequence of steps. For example, the publication "Planning support contact-points for acyclic motions and experiments on HRP-2", by Adrien Escande, Abderahmane Kheddar, Sylvain Miossec, and Sylvain Garsault, in: Experimental Robotics. Springer, Berlin, Heidelberg, 2009, discloses an approach for contact-before-motion planning for humanoid robots that enables addressing the task of finding a path for a mobile robot in a constrained environment. The initial sequence of postures for addressing a task may be obtained using an A*-search algorithm as discussed in more detail by Gienger, Michael, et al. in "Human-robot cooperative object manipulation with contact changes" 2018 IEEE/RSJ International Conference on Intelligent Robots and Systems (IROS), IEEE, 2018.

A set of constraints exists for each step within the sequence of postures. The set of constraints may include, e.g., contact locations and desired motion directions of the at least one object.

A contact refers to a match between one point and a coordinate frame of the body of the robot 2 on the one hand with one point and coordinate frame of the environment on the other hand, such that a distance between the body and the environment is 0. In the field of robotics, the term "coordinate frame" is often used in an abbreviated form as "frame".

Preferably, there is a description of invariance for at least one of the constraints. This means that that a constraint in the original pose can be modified by cancelling one or plural of the elements of the constraint without compromising the task. For example, an end-effector 9 of the robot 2 grasps a stick. In this example, there may exist constraint description describing the three-dimensional (3D-) description of the end-effector 9 of the robot 2 with respect to the stick. In this example an invariance in the description is the position along the stick, as the end-effector 9 may grasp the stick at any position along the length of the stick. A further description of invariance regards a rotation of the end-effector 9 around the circumference of the stick.

FIG. 1 illustrates an object-manipulation scenario involving a virtual character as an exemplary application of an embodiment.

FIG. 1 depicts in the left portion a bi-manual robot 2, which manipulates a large object 3 using two effectors 8. The right portion of FIG. 1 depicts an alternate embodiment of a virtual character in front and side view. The virtual character may be a person 2', e.g. a worker manipulating the physical object 3 with his two arms 8'. The description of the virtual character in case of the bi-manual robot 2 and of the virtual human worker 2' with regard to manipulating the virtual object 3 in the virtual environment correspond to each other. The following description of a preferred embodiment uses the bi-manual robot 2 as an example for sake of conciseness, without intending a restriction of the simulation method and the simulation system 1 to the bi-manual robot 2, or humanoid robots generally.

Figure 2:
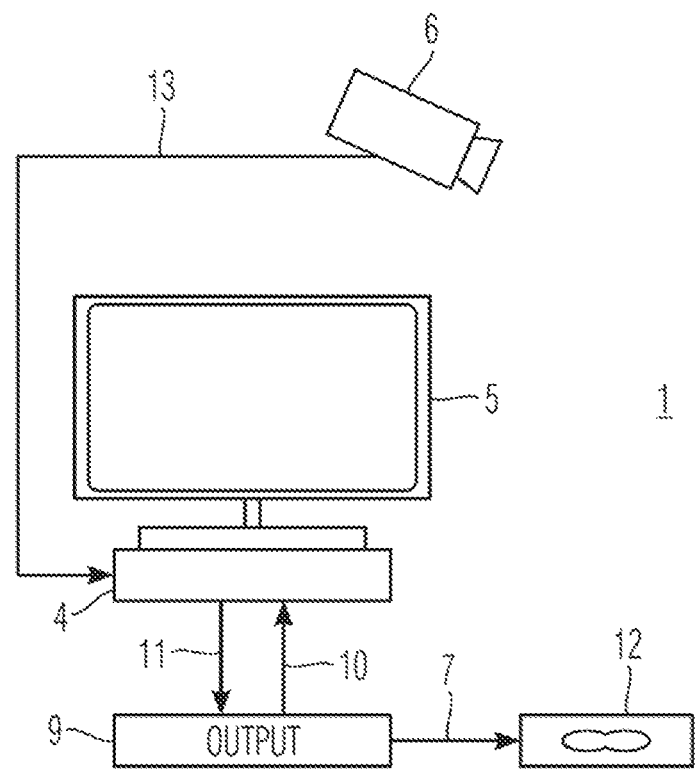
FIG. 2 provides an overview of a robotic system and its structural elements according to an embodiment.

FIG. 2 provides an overview of a simulation system 1 and its major structural elements according to an embodiment.

The simulation system 1 comprises an object tracking device 6, e.g. a camera- or marker-based object tracking device, and data processing equipment, e.g. at least one computer 4, which is configured to run planning algorithms and motion generation algorithms. In particular, a program implementing the method for controlling at least one effector trajectory runs on the computer 4.

The simulation system 1 acquires a task, for example via a user interface for receiving instructions to the simulation system 1. For example, the acquired task may instruct the simulation system 1 to put the object 3 on top of a stack of objects, for example.

The object tracking device 6 determines a location of the object 3. The object tracking device 6 generates a sensor signal 11 and provides the sensor signal 11 to the computer 4.

The computer 4 running a motion planning algorithm decomposes the acquired task into a sequence of steps. This may be done using an A* search algorithm as discussed in more detail by Gienger, Michael, et al. in "Human-robot cooperative object manipulation with contact changes", 2018 IEEE/RSJ International Conference on Intelligent Robots and Systems (IROS). IEEE, 2018.

The simulation system 1 computes a posture of the robot 2 for each of the sequence of steps and adds all postures into an overall kinematic model. The simulation system 1 analyses the sequence of postures for contact changes and object motions. In particular, the robotic system 1 applies algorithms "connect contacts" and "connect objects" to the kinematic model. These algorithms will be discussed in detail with reference to FIGS. 6 and 7. The model is transformed into the inverse kinematics problem according to equation (5). The computer 4 solves the inverse kinematics problem applying an optimization algorithm of choice. The optimized constraints, e.g. effector poses and intermediate object poses when re-grasping the object, which are determined in the optimization process are passed to a trajectory generation algorithm running on the computer 4. The trajectory generation algorithm may be implemented as discussed in "Task-dependent distribution and constrained optimization of via-points for smooth robot motions" by Sung, Changhyun, et al., 2015 IEEE International Conference on Robotics and Automation (ICRA). IEEE, 2015.

The generated trajectories for the end-effectors are passed to an inverse kinematics algorithm that computes the corresponding robot postures, which are sent in a control signal 11 to a simulation controller 9. The simulation controller 9 of the simulation system 1 generates simulation data 7, 10 from the control signal 11. The simulation may include image information displaying the at least one effector trajectory of the virtual effector 8 for output by a display device based on the control signal 11.

The display device may include at least one of a monitor 5 and a virtual reality/augmented reality (VR/AR-) device 12. The simulation data is preferably stored in a memory not shown in FIG. 3.

Figure 3:
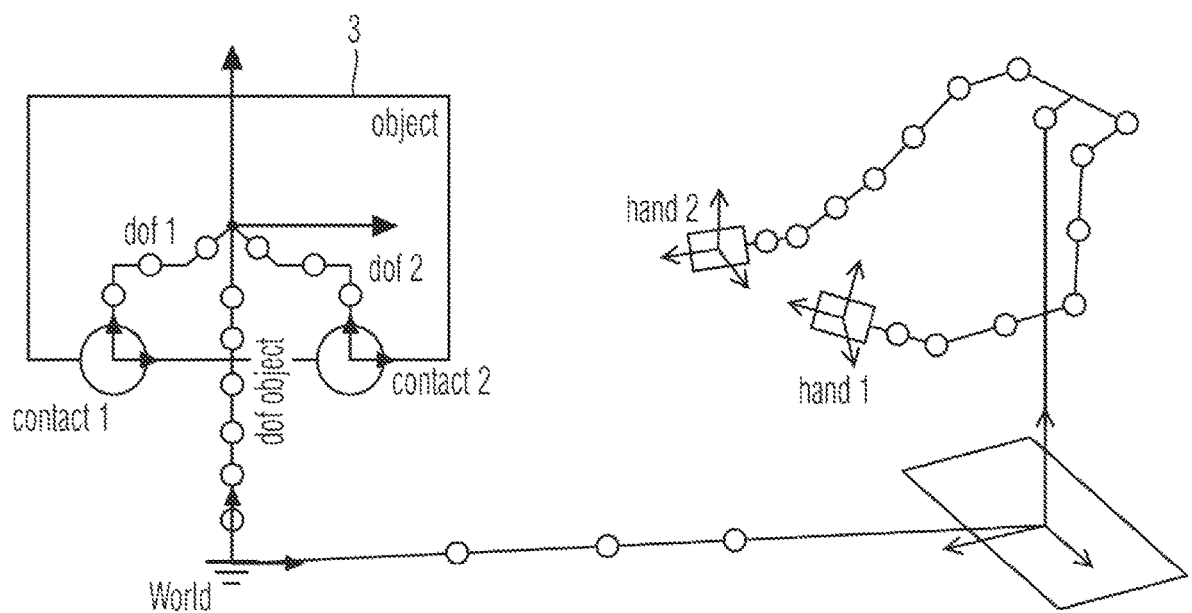
FIG. 3 illustrates an object-contact-model and a robot model for the robot-object manipulation scenario in the exemplary application of FIG. 1.

FIG. 3 illustrates an object-contact-model for the robot-object manipulation scenario in the exemplary application of the left portion of FIG. 1.

The object 3 is represented with respect to an inertial reference frame by a coordinate chain dof_object. The reference frame may also referenced as world frame. In FIG. 3, contact locations contact1 and contact2 are represented in coordinates relative to the object 3, illustrated by the coordinate chains dof1 and dof2. Dots on the lines connecting the object frame with the contacts (contact points) represent the degrees of freedom that couple the contacts to the object. Different mathematic descriptions for this structure exist, e.g. a combination of a translation and a quaternion, or three translations followed by three elementary rotations.

For the embodiment, it is not important how the degrees of freedom (dof) are modelled in detail. The description of the contact movement (contact point movement) with respect to the object is related to the Dexterous Manipulation concept. The description of the contact movement according to the embodiment is not with respect to the reference frame.

FIG. 3 illustrates a robot model for the robot-object manipulation scenario in the exemplary application of FIG. 1, in particular the object-centred kinematic model. FIG. 3 illustrates the coupling to the object-contact model.

The kinematic topology of the robot 2 in FIG. 3 is not part of the object-contact model of FIG. 3. It is, however, part of the kinematic model of a time instance that combines both object, contacts and the robot 2. Kinematic constraints between the effectors 8 of the robot 2 and contact locations ensure that the effectors 8 of the robot 2 track the contacts of the robot with the object 3.

The effectors 8 of the robot 2 depicted in FIG. 3 are hand1 and hand2. The contacts are contact1 and contact2. The corresponding kinematic constraints of the scenario in FIG. 3 are (hand1-contact1) and (hand2-contact2).

This modular separation of models allows to formulate a same task with robots 2 with different kinematic structures. In the subsequent illustrations, in particular FIGS. 8A to 8D, omits the robot model according to FIG. 3 for a more concise description.

Figure 4:
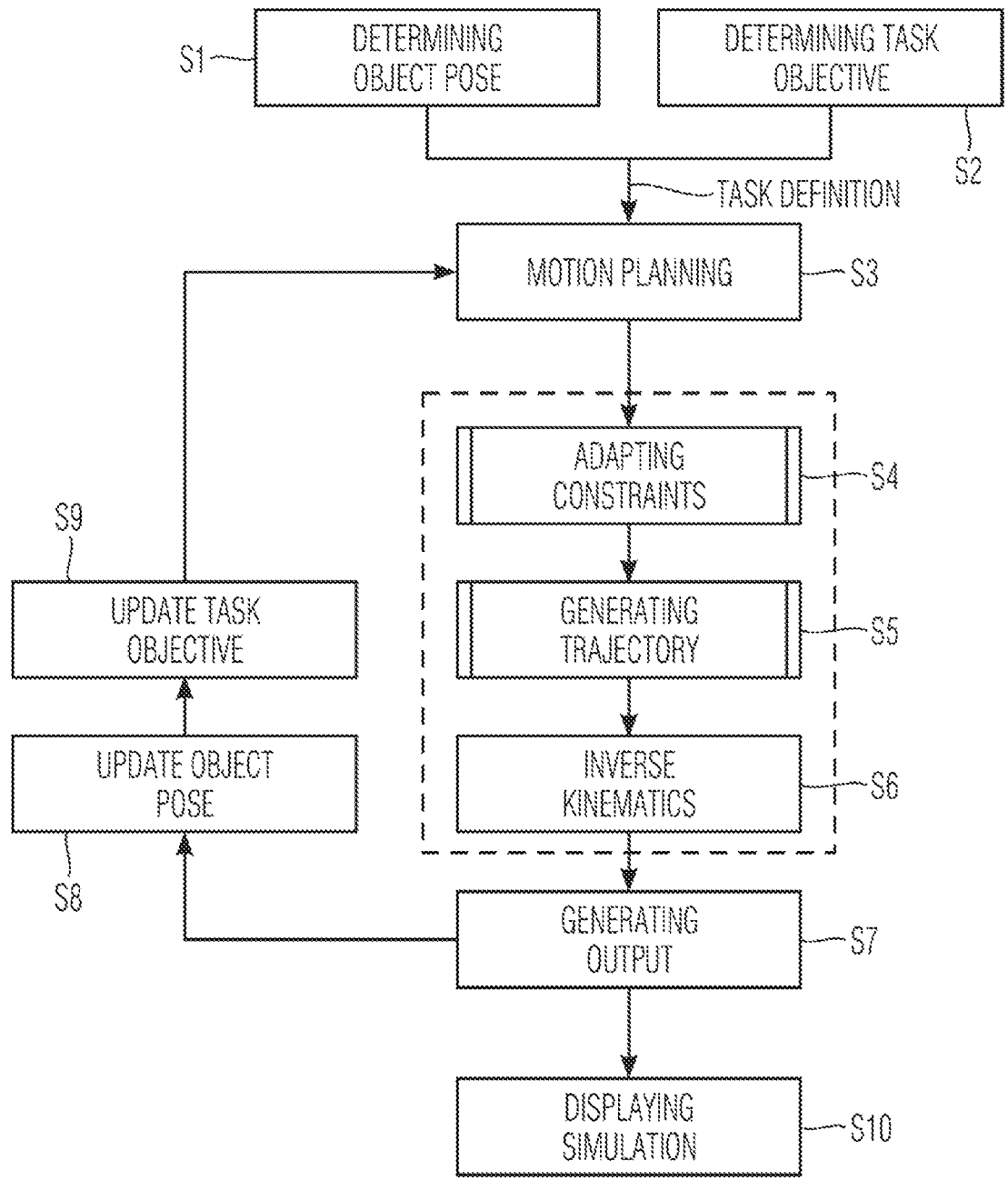
FIG. 4 depicts a method for controlling a robot applying an embodiment of the inventive method for motion planning in a flowchart.

FIG. 4 depicts a method for controlling a robot 2 applying an embodiment of the inventive method for motion planning in a flowchart.

The method steps implement a process of manipulating an object using effectors of the robot 2. The robot 2 is a bi-manual robot that grasps, manipulates and stacks large physical objects such as tires or boxes with its two effectors 8. Alternatively, the method steps may implement a collaborative robotic system, which performs the task cooperatively with a human.

In step S1, the method determines an object pose. Step S1 in particular determines an initial object pose. In step S1, the object tracking device of the simulation system 1 may determine a location of the object 3 or locations of objects as initial object pose within the environment (task environment) of the robot 2.

The method may execute step S2 of determining a task objective (task goal) in parallel or sequentially to step S1. For example, in step S2, the robotic system 1 may determine the task objective from an instruction provided externally, for example by a user via an interface to the simulation system 1. The simulation system 1 may determine the particular task objective from a generic task.

One example of a generic task may include the instruction to sort objects 3 and arrange the objects 3 in stacks. The task objective may include grasping a particular object 3 and put the grasped object 3 in a specific object orientation on top of a specific stack of objects 3. The specific stack is characterized by including objects 3 of a similar size.

The determined initial object pose and the determined task objective represent a task definition. The task definition is input to the step S3 of performing motion planning.

The task definition from steps S1 and S2 provides the basis for the step S3 of performing motion planning. In step S3, the simulation system 1 executes a motion planning algorithm on the task definition in order to generate a sequence of steps. The steps include a sequence of postures of the simulation system 1, in particular a sequence of postures of the effectors 8 of the robotic system 1 and a sequence of object poses to arrive at fulfilling the determined task objective, starting at the initial object pose. The motion planning algorithm applied in step S3 may be one of a plurality of known planning and motion generating algorithms available and discussed in literature in order to generate the sequence of postures provided by the step of motion planning. The robotic system 1 computes a posture of the robot 2, and in particular the effectors 8 of the robot 2 for each step of the sequence of postures. The computed postures are added to a kinematic model of the task.

One example for a motion planning system suited to perform step S3 is discussed in Gienger, Michael, et al.: "Human-robot cooperative object manipulation with contact changes", 2018 IEEE/RSJ International Conference on Intelligent Robots and Systems (IROS). IEEE, 2018.

The simulation system 1 subsequently uses the sequence of postures provided by step S3 of motion planning for performing constraint adaptation in step S4. The step of performing constraint adaptation in step S4 includes a sequence of sub-steps, which will be discussed in detail with reference to FIG. 6.

The step S4 in particular includes sub-step S4.2 of applying an algorithm for modifying a contact topology on the kinematic model. Furthermore, step S4 also includes sub-step S4.3 of applying an algorithm for modifying an object topology on the kinematic model.

Figure 6:
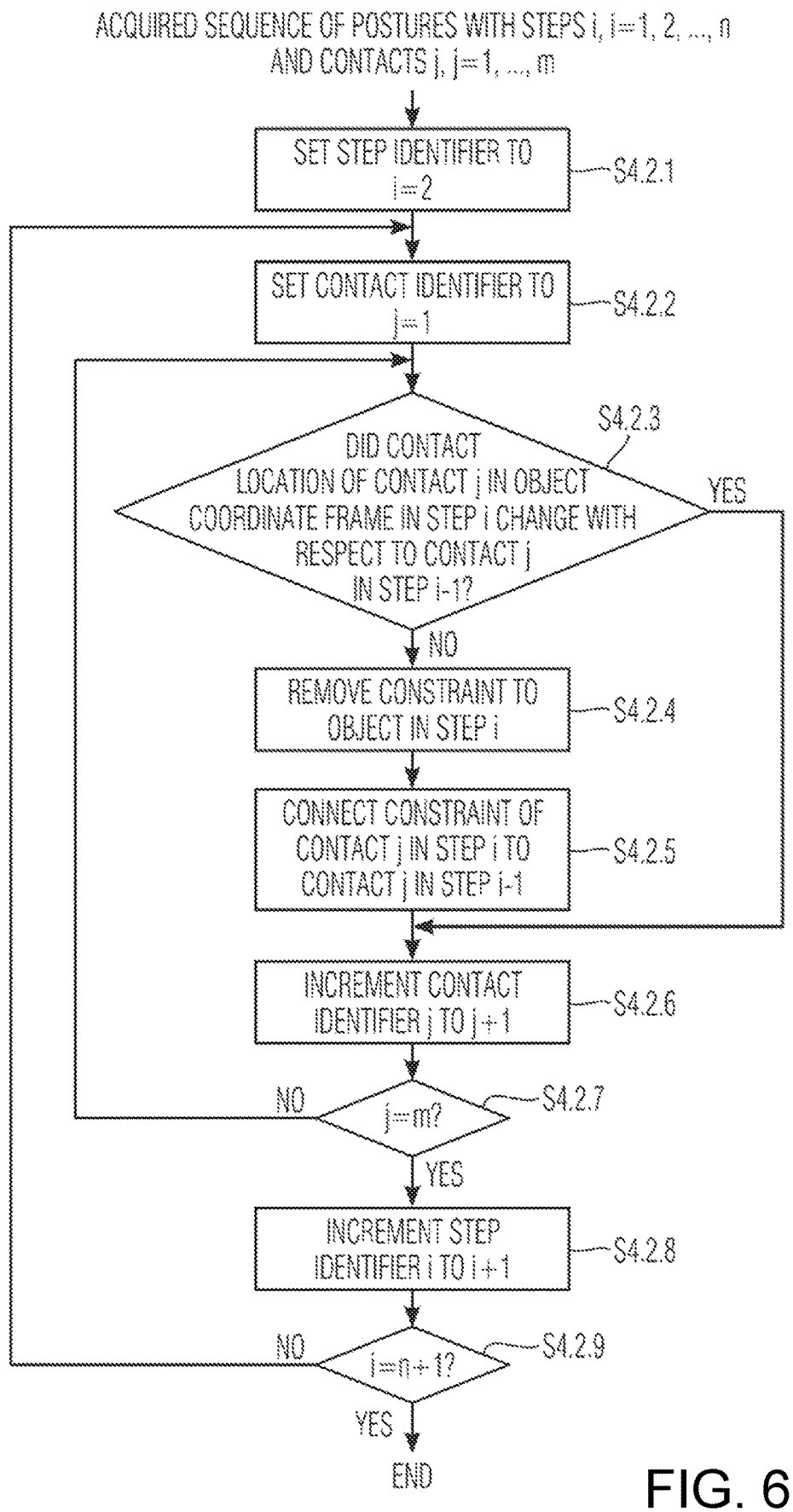
FIG. 6 depicts a flowchart for a process of connecting constraints across the sequence of postures in an implementation of the invention.

FIG. 6 discusses the algorithm for modifying a contact topology on the kinematic model according to step S4.2 in detail.

Figure 7:
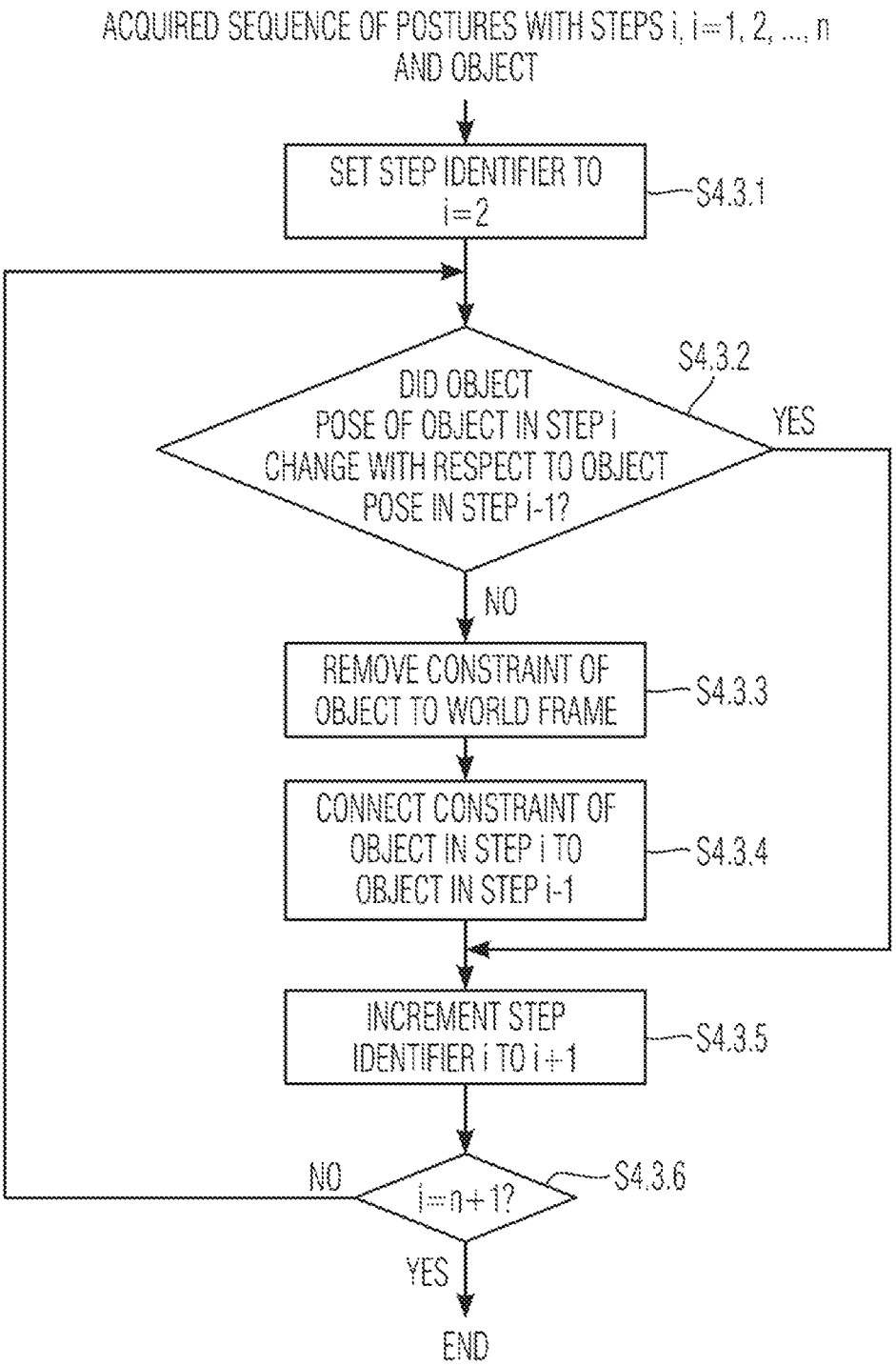
FIG. 7 depicts a flowchart for a process of connecting objects across the sequence of postures in an implementation of the invention.

FIG. 7 discusses the algorithm for modifying an object topology on the kinematic model according to step S4.3 in detail.

The contact and object constraints generated in step S4 perform the basis for generating the task level trajectory therefrom in step S5. The contact and object constraints generated in step S4 may, for example, include effector poses and intermediate object poses when the effectors 8 a re-grasping the object.

The adapted contact and object constraints generated in step S4 provide the input to subsequent step S5, in which the adapted contact and object constraints form the basis for generating the task level trajectory. Alternatively, step S5 may generate a plurality of task level trajectories. The step of generating the task level trajectory in step S5 includes a sequence of sub-steps, which will be discussed in detail with reference to FIG. 5.

Generating the task level trajectory in step S5 may be performed using one of a plurality of known trajectory generating algorithms which will be discussed with respect to FIG. 5.

The task-level trajectory generated in step S5 is then transformed into the inverse kinematics problem and the inverse kinematics problem is then solved using an optimization algorithm in step S6. Step S6 computes corresponding robot postures from the task-level trajectory. The computed robot postures may include sequences of joint angles for arriving at the task objective.

The output of step S6 represents a task description for achieving the task objective by the simulation system 1. Step S7 generates a control signal from the generated trajectory provided previous step S6 to control the robot 2 as a virtual character in order to achieve the task objective.

The embodiment depicted in FIG. 4 implements a simulation system 1 configured to perform online adaptation. In step S8, an update of the object pose is performed.

Additionally or alternatively, in step S9, the task objective is updated. FIG. 4 depicts steps S8 and S9 being sequentially performed, the steps may alternatively be performed at least partially concurrently.

Step S10 uses the control signal to generate simulation data, in particular an animated display in of the robot 2 performing the predefined task and implementing the generated at least one effector trajectory. The simulation data is provided to the display for presentation to a user of the method.

The object tracking device 6 of the simulation system 1 may acquire sensor data for updating the object pose and the task objective. The updated task objective and the updated object pose ate then used to update the task definition and to perform motion planning according to step S8 using the updated task definition. The closed loop of the flowchart of FIG. 4 implements an online adaptation system. The online adaptation structure with steps S3-S4-S5-S6-S7-S8-S9-S3 according to FIG. 4 is a particularly advantageous structure for performing tasks in collaboration with a human, as the task definition may change due to unpredicted actions of the collaborating human or new instructions provided by the collaborating human.

Figure 5:
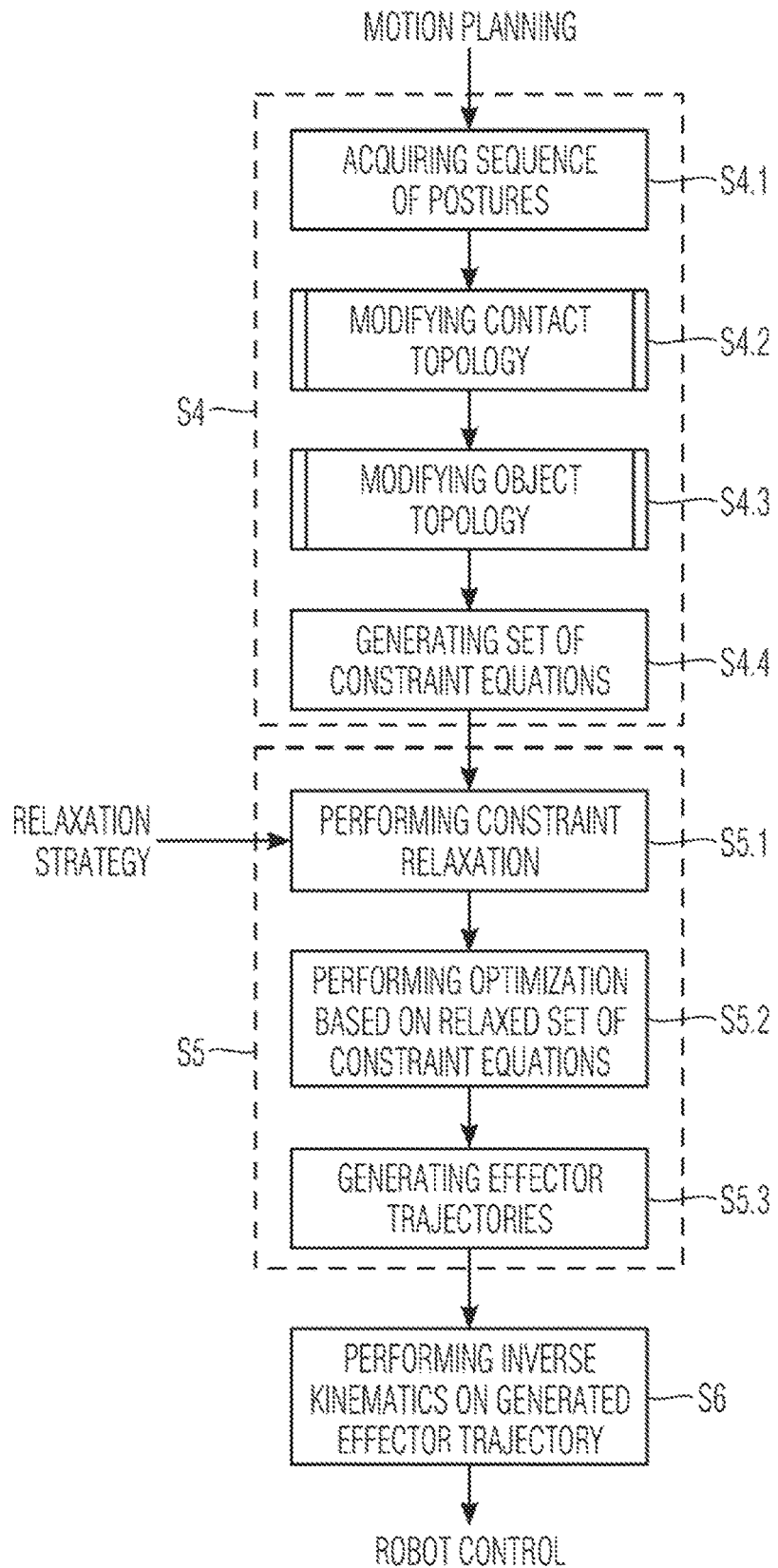
FIG. 5 illustrates the method for controlling a trajectory according to an embodiment in a flowchart.

FIG. 5 illustrates steps S4 and S5 of the method for controlling a trajectory according to an embodiment in a flowchart.

In step S4.1, the simulation system 1 acquires the sequence of postures generated by a motion planning algorithm in step S3 as an initial sequence of postures. Step S4.1 is the first sub-step for performing constraint adaptation in step S4. The acquired sequence of postures is then input to step S4.2, in which an algorithm for modifying a contact topology on the kinematic model is applied in order to generate a modified contact topology of the kinematic model. FIG. 5 illustrates the algorithm for modifying a contact topology on the kinematic model according to step S4.2 in detail.

The method proceeds to step S4.3 of applying an algorithm for modifying an object topology of the kinematic model to generate a modified object topology of the kinematic model. FIG. 7 illustrates the algorithm for modifying an object topology on the kinematic model according to step S4.3 in detail.

The modified kinematic model with the modified contact topology according to step S4.2 and the modified object topology according to step S4.3 are subsequently used for generating a set of constraint equations in step S4.4 based on the modified kinematic model.

The step S4.4 generating the constraint equations is, may be performed according to generally known processes discussed in the literature in the field of robotics. In the following, two exemplary approaches for implementing step S4.4 are summarily discussed: a first approach corresponds to a task level constraint formulation. A second approach is a kinematic joint coupling formulation.

The first approach based on the task-level constraint formulation uses task-level constraints, which are included in a constraint vector $\delta x$ and have a corresponding constraint Jacobian matrix $J_c$. Initially, a kinematic model is generated that comprises all steps of the sequence of postures. For a sequence of postures comprising n steps, the corresponding kinematic model comprises $$n \times \text{dof\_i}; \quad (1)$$

degrees of freedom. In expression (1), dof_i denotes the number of degrees of freedom of an individual step of the sequence of steps. Furthermore, a constraint vector includes all kinematic constraint equations of the entire sequence of postures. The kinematic constraint equations describe the contacts and the object movements in the sequence of postures. Thus, the kinematic constraint equations include the information generated by performing the processes "connect contacts" in step S4.2 of modifying a contact constraint topology and "connect objects" in step S4.1 of modifying the object topology in the preceding steps of the method. The algorithms for doing this are explained for the algorithm "connect contacts" depicted in the flowchart of FIG. 6 and the algorithm "connect objects" in the flowchart according to FIG. 7.

Mathematically, a formulation of the problem according to the task-level constraint formulation reads:

$$\begin{pmatrix} J_T \\ J_c \end{pmatrix} \delta q = \begin{pmatrix} \delta x_T \\ \delta x_c \end{pmatrix}; \quad (2)$$

In equation (2), the term $J_T$ comprises all task objectives that are not part of the contact constraints and object motion constraints, e.g. a desired movement of the object or a desired movement of effectors, or a movement of a motor-driven camera. Matrix $J_c$ is the constraint Jacobian matrix that is assembled with the sequence of postures and the object movement constraints. The vector $\delta q$ comprises the displacement of the degrees of freedom q of the entire kinematic model including all steps of the sequence of postures. The vector $\delta x_T$ comprises the desired displacements for all task objectives that are not part of the contact and object motion constraints. The term $\delta x_c$ comprises all constraint displacements. The constraint displacements $\delta x_c$ are typically zero. Alternatively, the constraint displacements may selected to ensure that the constraints lie on a desired location.

Essentially, a large kinematic model including all steps of the sequence of postures is generated. The kinematic model comprises all constraint equations within one holistic linear equation system according to equation (2).

This is a conventional way to formulate such constraints. The number of all task-level constraints corresponds to the dimension n of the vector $\delta x = (\delta x_T^T \; \delta x_c^T)^T$. This requires solving the linear equation system (2), which has an order O $(n^3)$ with n denoting the number of constraint equations. It is noted, that, in terms of computation time, this formulation scales sufficiently well for a small number of constraints.

According to the second approach of the kinematic joint coupling formulation, an approach is provided whose modelling proves advantageous in terms of scalability of the computational effort required for a large number of constraints. The basic concept of kinematic joint coupling is to directly couple the constraints on the level of the degrees of freedom. It uses constraint projection techniques that are also applied in multi-body dynamics computations. Essentially, a set of degrees of freedom that is coupled kinematically is subsumed in one virtual degree of freedom. Formally, it can be written as $$J^*_c = JA: \quad (3)$$

Equation (3) describes a projection of degrees of freedom on a virtual degree of freedom. Matrix A is the projection matrix, which projects the coupled degrees of freedom q onto the virtual degrees of freedom q*. Thus, equation (2) may be rewritten as $$J^*_c \delta q^* = \delta x; \quad (4)$$

Equation (4) describes a virtual-degree of freedom based constraint formulation. This constraint formulation has the advantage that the explicit constraint displacements $\delta x_c$ of equation (2) are not included and the dimension of the virtual degrees of freedom $\delta q^*$ is less than the dimension of degrees of freedom $\delta q$. The reduction in dimension improves the scalability of solving the resulting linear equation system significantly.

Applying kinematic joint coupling formulation according to the second approach on the exemplary sequence of postures illustrated in FIG. 8C shows that the problem can be solved five times faster than when using the first approach of task-level constraint formulation.

Returning to the flowchart of FIG. 5, the step S5 of generating a trajectory is discussed in more detail using FIG. 5, in particular its lower portion.

The generated set of constraint equations from step S4 and sub-step S4.4 is subsequently used for sub-steps S5.1, S5.2 and S5.3 according to the embodiment of FIG. 5. Step S5, generates a trajectory, in particular an effector trajectory or effector trajectories. In step S5.1, a constraint relaxation is performed on the generated set of constraint equations. Step S5.1 may perform the constraint relaxation based on a relaxation strategy on the constrained contacts and the constrained objects, which model the interdependencies of motions of the object and the contacts between the individual steps of the sequence of postures. The constraint relaxation of Step S5.1 enables to efficiently utilise the concepts of the process of constraining the contact topology according to step S4.2 and constraining the object topology according to step S4.3.

The relaxation strategy is a strategy or set of strategies, which change mathematically strict constraints to relaxed constraints. Mathematically strict constraints are constraints, which ensure a precise constraint satisfaction. The relaxed constraints are constraints, which in comparison to the mathematically strict constraints before step S5.1 achieve the result that a Null space motion will be projected into the relaxed constraint coordinates. Examples for performing constraint relaxation include (1) allowing a deviation of the constraint instead of enforcing the originally strict constraint.

An example for the approach according to (1) for performing constraint relaxation is regularization of individual constraints within the inverse kinematics, such as the Damped Least Squares approach according to: "Review of the damped least-squares inverse kinematics with experiments on an industrial robot manipulator" by Chiaverini, Stefano, Bruno Siciliano, and Olav Egeland. In: IEEE Transactions on control systems technology 2.2 (1994): 123-134. A further approach for relaxing constraints in step S5.1 includes (2) removing constraint coordinates that are invariant for the task.

European patent EP 1 728 600 B1 discloses the approach according to (2) when controlling an effector trajectory from a current state to a target state whereby invariant control parameters are taken into account. Invariant control parameters are control parameters that are not required, but do not interfere to achieve a given task. This could correspond to an end effector rotation about a cylindrical object 3. The effector trajectory is then represented in a task description, the task description being void of the invariant control parameters. As the task description does not include the invariant control parameters, a dimension of the Null space is increased.

Yet a further approach for relaxing constraints in step S5.1 includes (3) removing constraint coordinates that are within a pre-defined interval or region.

Particular examples for the approach according to (3) for relaxing constraints provide, for example, Gienger, Michael, Herbert JanBen, and Christian Goerick in "Exploiting task intervals for whole body robot control", 2006 IEEE/RSJ International Conference on Intelligent Robots and Systems. IEEE, 2006; Sugiura, Hisashi, et al. in "Real-time self collision avoidance for humanoids by means of nullspace criteria and task intervals", 2006, 6th IEEE-RAS International Conference on Humanoid Robots. IEEE, 2006; Berenson, Dmitry, et al. in: "Pose-constrained whole-body planning using task space region chains", 2009 9th IEEE-RAS International Conference on Humanoid Robots. IEEE, 2009; and Gienger, Michael, Marc Toussaint, and Christian Goerick. "Task maps in humanoid robot manipulation." 2008 IEEE/RSJ International Conference on Intelligent Robots and Systems. IEEE, 2008.

These exemplary relaxation strategies for performing constraint relaxation in step S5.1 achieve the effect that the Null space motion is projected into the relaxed constraint coordinates. Illustrative examples include
- a rotation of an effector 8 contacting surface about contact normal vector,
- a displacement of contacts along an edge or a face of a geometric structure,
- an acceptable inclination of an effector contact with respect to the contacting surface, and
- an object 3 to be re-grasped at an arbitrary position or with an arbitrary pose.

Performing the constraint relaxation of step S5.1 leads to consistently adjusting the constraint coordinates so that a cost function H (q) will become optimal. This effect will be discussed with reference to an example shown in FIG. 8 below.

Step S5.1 generates a relaxed set of constraint equations by performing constraint relaxation. Step S5.2, succeeding to step S5.1, performs the optimization on the relaxed set of constraint equations.

In step S5.3, the optimization result of the relaxed set of constraint equations provides the basis to generate an effector trajectory therefrom. In particular, the relaxed set of constraint equations provides the basis to generate or to optimize the effector trajectory. The possibly optimized task level trajectory is provided to step S6 for performing inverse kinematics, and subsequently in the control signal 11 to the output controller for generating based on the corresponding task description.

Solving the mathematical formulation of the posed problem modelled either by the task-level constraint formulation or the kinematic joint coupling may be performed in a corresponding manner. A motion of the degrees of freedom $\delta q$ or $\delta q^*$ is computed in step S5.3 using inverse kinematics performing a generally known approach. For example, publication "Automatic supervisory control of the configuration and behavior of multibody mechanisms" by Liegeois, Alain, in: IEEE transactions on systems, man, and cybernetics 7.12 (1977): 868-871 discusses a suitable approach in detail.

Alternatively, any other differential inverse kinematics algorithm with redundancy resolution may be used.

An important aspect of the inverse kinematics calculation is the resulting Null space motion. Null space motion typically exists when a model has more degrees of freedom than constraints. Such kinematic models are called redundant models. In present context, it is assumed that the generated model is a redundant model. Redundancy resolution is a concept to project a scalar cost term H (q) into the Null space of the motion.

The Null space motion is the motion of the system that does not change any of the task-level constraints in $\delta x$.

The cost term H (q) is described in the configuration space q of the robot 2. The configuration space is the space of the controllable degrees of freedom of the robot 2. The configuration space may be composed of individual joints 8.1 of a robot 2 and/or more complex kinematic mechanisms to which controllable degrees of freedom can be assigned.

Typical examples for the cost term H (q) describe avoiding joint limits, or avoiding self-collisions with regard to the effectors 8 of the robot 2. The particular choice of the cost function H (q) as criterion is not important present context. Computing the motion of the overall sequence of postures under consideration of all degrees of freedom q, all task-objectives and all constraints $\delta x$ and the cost function H (q) may be formulated as $$\delta q = J^*_C \delta x - N \, \mathrm{grad}(H(q))^T; \quad (5)$$

Equation (5) describes redundant differential inverse kinematics. Matrix $J_c$ # refers to the pseudo-inverse of the Jacobian matrix $J_c$. Matrix N is the corresponding Null space projection matrix. The gradient operator grad (.) in equation (5) defines the gradient of the cost term H with respect to q.

The cost term H projection has an important role in present context, and had been discussed in the section with regard to step S5.1 of performing constraint relaxation on the generated set of restraint equations, since it defines the gradient direction of the objective of H (q).

Equation (5) may be solved efficiently using known techniques in the field of linear algebra. For example, Cholesky decomposition or Singular Value decomposition perform well for solving problems such as equation (5).

Figure 8A:
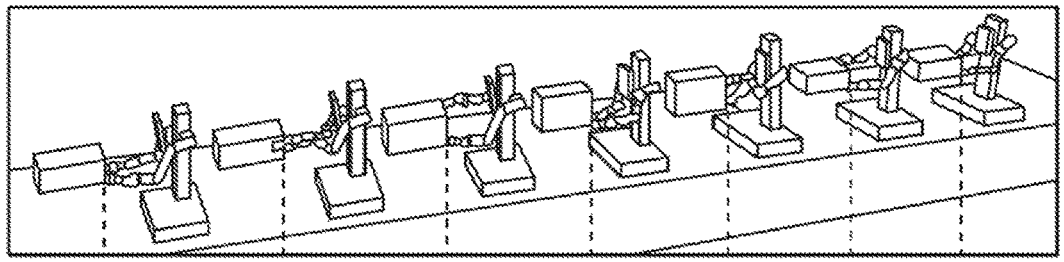
FIG. 8A illustrates a robot-object manipulation scenario including a sequence of steps in an exemplary application of an embodiment.

FIG. 8A illustrates a robot-object manipulation scenario including a sequence of steps in an exemplary application of an embodiment.

The depicted scenario considers a sequential task such as turning the object upside-down. The scenario can be represented as a sequence of the above kinematic models. FIG. 8A shows seven steps ranging from step 1 to step 7 of the depicted sequence of postures where spatial changes of contacts and movements of the object occur.

FIG. 8B shows a sequence model of the manipulation scenario according to FIG. 8A comprising a sequence of postures without coupling of consecutive steps.

FIG. 8B displays the corresponding kinematic model for the sequence of postures according to FIG. 8A. The kinematic chain of each contact is from "contact" via "object 3" to "reference frame". Therefore, each step's corresponding posture is independent of the posture of all other steps of the depicted sequence of postures.

A first new process of the method is to modify a contact constraints topology according to the sequence of postures as shown in FIG. 8B. The result of performing the method to modify the contact constraints topology is depicted in FIG. 8C.

In FIG. 8B, from step 1 to step 2, the right contact does not change its location on the object 3, it remains fixed in the object coordinate frame. According to the process of modifying a contact constraint topology, the kinematic constraint of the right contact is amended to connect to the respective contact of the previous step. In FIG. 8C, an arrow connecting the right contact of step 2 with the corresponding right contact of step 1 is added. The kinematic chain of the right contact in step S2 is cancelled.

From step 2 to step 3, both contacts remain fixed in the object's coordinate frame. The object 3 is rotated from step 2 to step 3 in FIG. 8B. Therefore, both contacts of step 3 are connected to the corresponding contacts of step 2. The kinematic chains of the right contact and the left contact in step S3 is cancelled.

This strategy of modifying a contact constraints topology according to the sequence of postures as shown in FIG. 8B is followed until the end of the sequence, e.g. step S7 of the sequence of postures is reached. FIG. 8C shows the resulting sequence model with a contact constraint topology.

FIG. 8C shows the sequence model of the manipulation scenario according to FIG. 8A comprising a sequence of postures with a coupling of fixed contacts of respective consecutive steps of the sequence of postures.

While the embodiment discussed with reference to FIG. 8A to 8D, uses a bi-manual robot model for illustration, it is evident that the concept is applicable to any number of contacts, and also to more than one object 3.

Furthermore, the concept is also not limited to effectors 8 of a robot 2 (robot arms). Anything that can be mathematically represented as a chain of rigid bodies (tree of rigid bodies) may be understood to be covered by the term "effector".

Furthermore, the concept is also not limited to effectors of a stationary robot 2. The concept is also applicable for, e.g. mobile platforms, multi-legged robots 2 or bio-mechanical models of a human 2'. In these applications, the effectors 8 of a (mobile) robot 2 may be means for moving the robot 2, such as legs (robot legs).

Figure 8D:
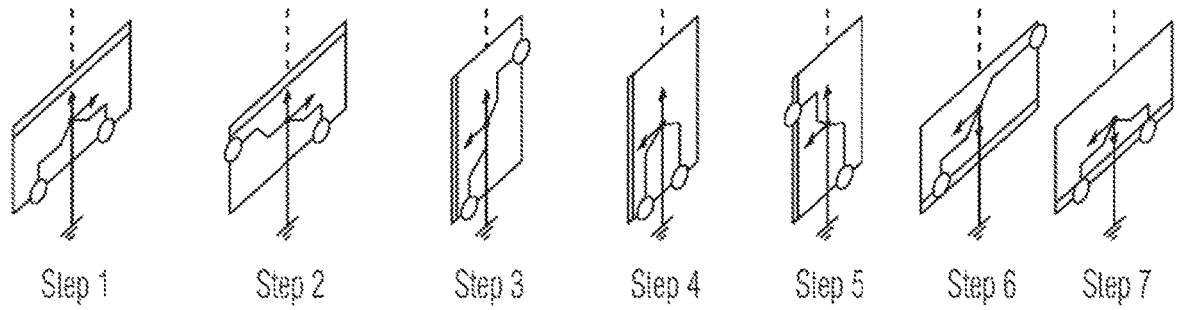
FIG. 8D shows a sequence model of the manipulation scenario according to FIG. 8A comprising a sequence of postures with coupling of fixed contacts of the consecutive steps and coupling of constant object poses.
Figure 8D:
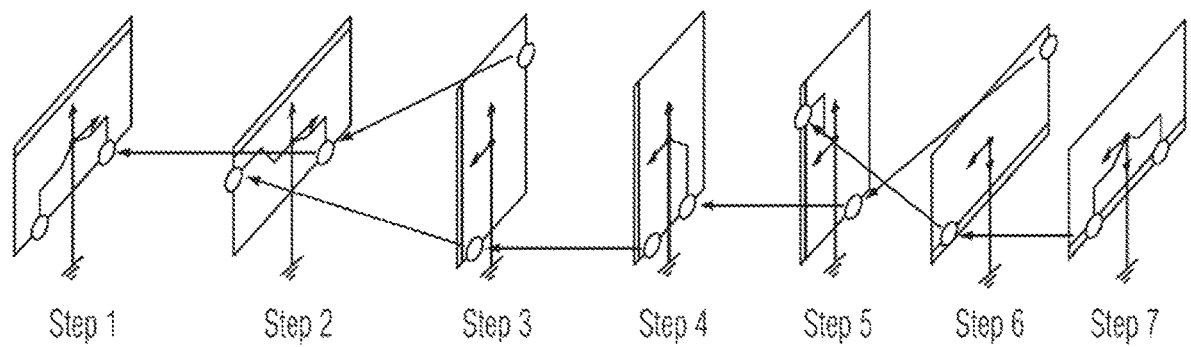
Figure 8D:
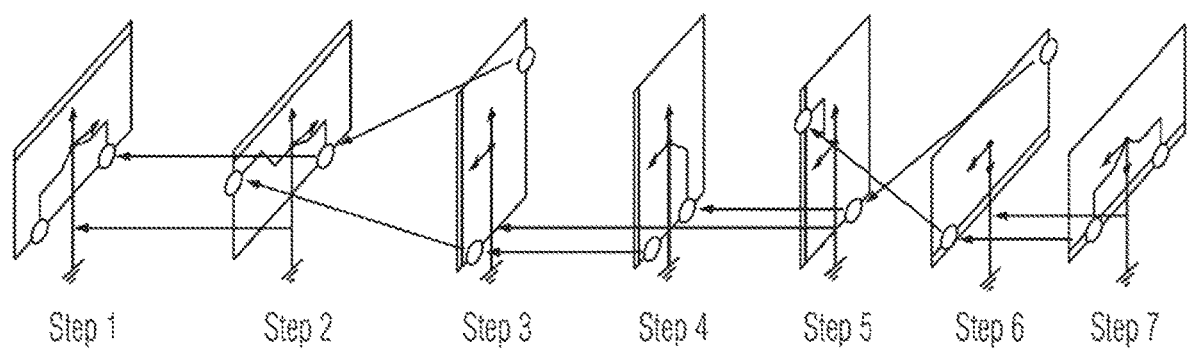

FIG. 8D shows a sequence model of the manipulation scenario according to FIG. 8A comprising a sequence of postures with coupling of fixed contacts of the consecutive steps and coupling of constant object poses. With regard to the sequence of postures with coupling of fixed contacts of the consecutive steps reference to FIG. 8C and the corresponding section of the description is considered sufficient.

A second new process of the method is to modify an object constraints topology according to the sequence of postures. This process may be performed independent of the first new process.

Alternatively, the second new process of the method of modifying an object constraints topology according to the sequence of postures may be performed in combination with the first new process. In FIG. 8D, the result of performing the first and the second new process is depicted.

FIGS. 8A to 8D, basing on a same example sequence of postures, several transitions between steps S1 to S7 exist, in which the effectors 8 change their location, but the pose of the object 3 remains constant in the inertial reference frame. This is the case, for example for the transition from step 1 to step 2, for the transitions from step 3 to step 4, from step 4 to step 5, and from step 6 to step 7.

If an object pose in the reference frame of a given step does not change with respect to the preceding step, a kinematic constraint of the object pose to the step's reference frame is deleted, and a new constraint to the object pose in the preceding step is generated and added. In the depicted example of FIGS. 8A to 8D, new object constraints are added from step 1 to step 2, from step 3 to step 4, from step 4 to step 5, and from step 6 to step 7. Simultaneously, kinematic constraints of the object pose to the step's reference frame are deleted in steps 2, step 4, step 5 and step 7, as shown in FIG. 8D.

FIG. 6 depicts a flowchart for a process of connecting contact constraints across the sequence of postures in an implementation of the invention. The process is an embodiment of method step S4.2 for modifying the contact topology of the sequence of postures. The process of connecting contact constraints is performed on the sequence of postures including postures (steps) i, i ranging from i=1, 2, ..., n and contacts j, j ranging from j=1, 2, ..., m.

In step S4.2.1, a step identifier is set to i=2. The method proceeds to step S4.2.2, in which a contact identifier is set to j=1.

In step S4.2.3 succeeding to step S4.2.2, the process checks whether a contact location of contact j in object coordinate frame in step i did change with respect to contact j in step i−1.

If the answer in step S4.2.3 is YES, meaning that the contact location of contact j in object coordinate frame in step i did indeed change with respect to contact j in step i−1, the method proceeds to step S4.2.5. In step S4.2.4, the constraint to object in step i is removed. In step S4.2.5 succeeding to step S4.2.4, the constraint of contact j in step i is connected to contact j in step i−1. The method then proceeds to step S4.2.6.

If the answer in step S4.2.3 is NO, meaning that the contact location of contact j in object coordinate frame in step i did not change with respect to contact j in step i−1, the method proceeds directly to step S4.2.6.

In step S4.2.6, the contact identifier is increased by one from j to j+1. From step S4.2.6, the method proceeds to step S4.2.7. In step S4.2.7, the method determines whether all contacts of a current step i have been asserted for changes with respect to their corresponding contact location the in object coordinate frame to the contact location in the immediately preceding step i−1. In particular, step S4.2.7 determines whether the contact identifier j is equal to m.

If the answer in step S4.2.7 is NO, the method assumes there remain contacts of the current step i not been tested yet. In this case, the method returns to step S4.2.3 and repeats the steps S4.2.3, S4.2.4, S4.2.5, and S4.2.6 (inner loop) for the next contact having the increased contact identifier j+1.

If the answer in step S4.2.7 is affirmative (YES), the method assumes all contacts of the current step i having been tested and the method succeeds to step S4.2.8 and increments the step identifier i by one to i+1. The method then proceeds to step S4.2.9. In step S4.2.9, the method determines whether the all steps i of the sequence of postures S have been tested with regard to change of their spatial contact location with respect to the preceding step. In particular, step S4.2.9 determines, whether step identifier i equals n+1.

If the step identifier does not equal 1, e.g. the answer in step S4.2.9 is NO, the method returns step S4.2.2 and sets the contact identifier to j=1. The method proceeds by checking all contacts j for the new step i.

If the step identifier does indeed equal 1, e.g. the answer in step S4.2.9 is YES, the method assumes that all steps i between step 2 and step n of the sequence of postures have been checked for change in contact locations of all contacts with regard to the respective preceding step and terminates the process of connecting contacts and step S4.2 of modifying the contact topology of the method.

The concept of the algorithm "connect contacts" underlying method step S4.2 to connect the constraints across the sequence can be summarized:

Algorithm "connect contacts"
For each step s_i of sequence S:
  Did contact location in object coordinate frame change with respect to the previous step s_i−1?
    No: Remove constraint to object in step s_i and connect constraint to contact point of previous step;
    Yes: Leave contact constraint as it is;
End for each.

The discussed example of the algorithm "connect contacts" regards a sequence of postures with an exclusively sequential structure. Alternatively or additionally, a particular example of the sequence of postures may have a structure including closed chain of postures. In a sequence of postures representing a closed chain of postures, constraints of a first posture in the sequence of postures are connected to a last posture of the sequence of postures. The former posture may be an initial posture of the sequence of postures, or any posture preceding the immediately preceding posture.

FIG. 7 depicts a flowchart for a process of connecting objects across the sequence of postures in an implementation of the invention. The concept of the algorithm "connect object" underlying method step S4.3 to connect the constraints across the sequence of postures can be summarized:

Algorithm "connect objects":
For each step s_i of sequence S:
  Did object pose change with respect to the previous step s_i−1?
    No: Remove object constraint with respect to reference frame and connect object of step s_i with constraint to previous step;
    Yes: Leave object constraint as it is;
End for each.

The discussed example of the algorithm "connect objects" regards a sequence of postures with an exclusively sequential structure. Alternatively or additionally, a particular example of the sequence of postures may have a structure including a closed chain of postures. In a sequence of postures representing a closed chain of postures, constraints of a first posture in the sequence of postures are connected to a last posture of the sequence of postures.

In particular, the process is an embodiment of method step S4.3 for modifying the object topology of the sequence of postures. The process of connecting contact constraints is performed on the sequence of postures including postures (steps) i, wherein i is an integer between i=1, 2, ..., n.

In step S4.3.1, a step identifier is initialized to i=2. The method proceeds to step S4.3.2, in which the method determines whether an object pose of the object 3 in current step i changes with respect to the object pose of the object 3 in the immediately preceding step i−1 of the sequence of postures.

If the answer in step S4.3.2 is NO, meaning that the contact location of contact j in object coordinate frame in step i did not change with respect to contact j in step i−1, the method proceeds to step S4.3.3. In step S4.3.3, the constraint of the object to the reference frame is removed in the current step i. The method then proceeds to step S4.3.4. In step S4.3.4, the constraint of the object in step i is connected to the object in step i−1, the immediately preceding step to the current step i in the sequence of postures. The method then proceeds to step S4.2.5.

If the answer in step S4.3.2 is YES, meaning that the object pose of the object coordinate frame in step i did indeed change with respect to the object pose of the object 3 in the immediately preceding step i−1 of the sequence of postures, the method directly proceeds to step S4.2.5, skipping the steps 4.3.3 and S4.3.4.

In step S4.2.5, the step identifier i is incremented by one from i to i+1. The method then proceeds to step S4.3.6. In step S4.3.6, the method determines whether the all steps i of the sequence of postures have been tested with regard to change of their spatial object pose with respect to the immediately preceding step of the sequence of postures. In particular, step S4.3.6 determines, whether step identifier i equals n+1.

If the step identifier does not equal 1, e.g. the answer in step S4.3.6 is NO, the method proceeds with step S4.3.2. The method proceeds by checking the object pose for new step i+1.

If the step identifier does indeed equal 1, e.g. the answer in step S4.3.6 is YES, the method assumes that all steps i between step 2 and step n of the sequence of postures S have been checked for a change in object pose with regard to the object pose in the immediately preceding step and terminates the process of connecting objects, and step S4.3 of modifying the object topology of the method.

Figure 9:
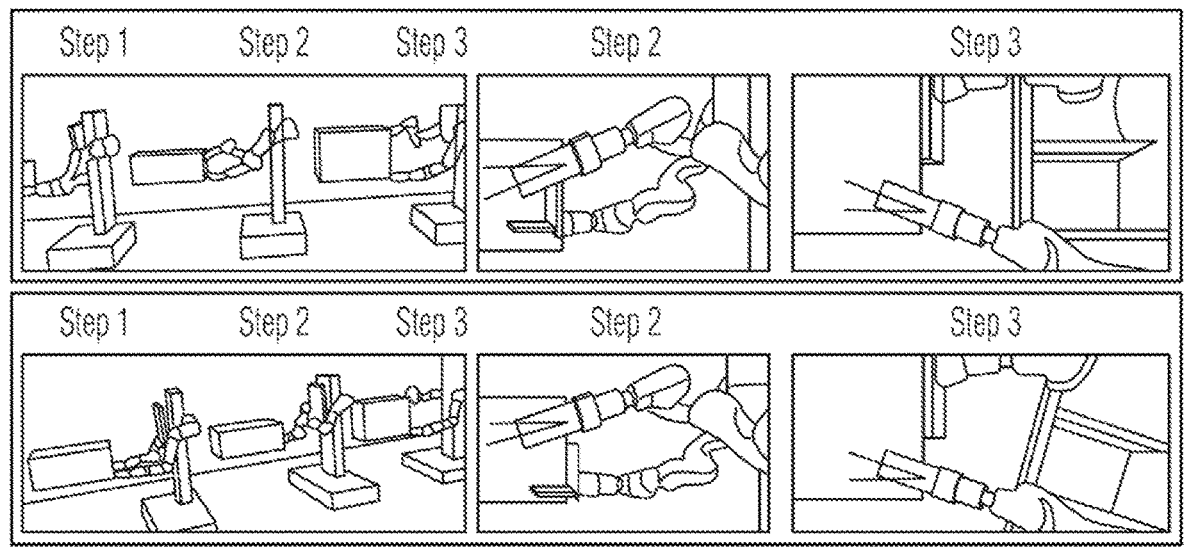
FIG. 9 illustrates a sequence of postures before and after an optimization of the sequence of postures.

FIG. 9 illustrates a sequence of postures before and after an optimization of the sequence of postures. The task addressed in FIG. 9 includes rotating of a box-shaped object 3 by the robot 2 with two effectors 8 around a horizontal axis. The step of constraint relaxation results in consistently adjusting the constraint coordinates so that the cost function H (q) will become optimal. This is illustrated in FIG. 9, which refers to the first three steps of the sequence of postures according to FIGS. 8A to 84D.

FIG. 9 shows the three steps, step 1, step 2, and step 3, of an exemplary sequence of postures. The upper portion depicts the robot postures before an optimization is performed. The upper portion corresponds to a value of the cost function H (q) that is 0.617.

The left end-effector 9 of step 2 and 3 are coupled. A rotation of the end-effector 9 around the normal vector of the box face is allowed. When performing constraint relaxation in step S5.1, the corresponding constraint is therefore removed.

The lower portion of FIG. 9 illustrates the resulting trajectories after performing a constraint relaxation according to step S5.1 and subsequent optimization of step S5.2. A resulting cost value of the cost function H (q) that is 0.438, which is an improvement of about 30%, when the reducing the cost value numerically corresponds to improving the solution. FIG. 9 shows the resulting angle between end-effector 9 of the robot 2 and box 3 is depicted with black lines. FIG. 9 shows that angles in step 2 and 3 are the same.

For the optimized solution, the angle decreased in the lower portion of FIG. 9, but the angles in the lower portion of FIG. 9 are still consistent between step 2 and step 3 of the sequence of postures.

Figure 10:
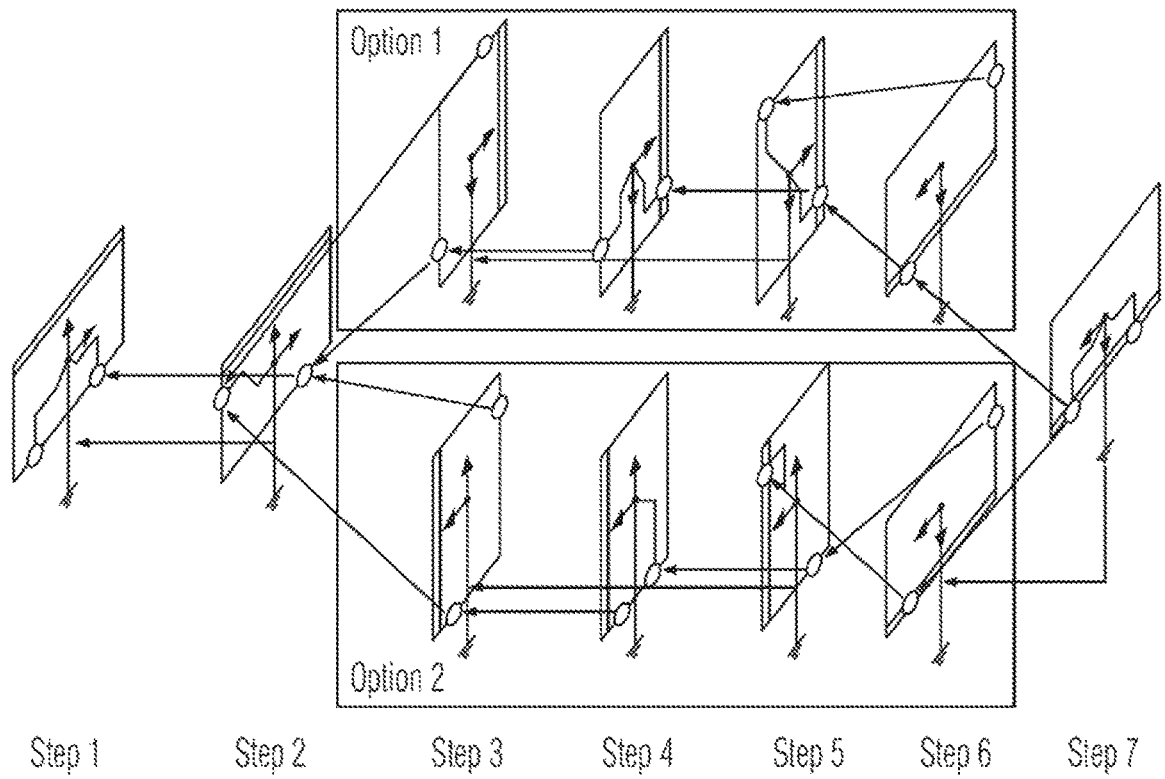
FIG. 10 illustrates a graph representation of the task comprising two alternative branches in an implementation of the invention.

FIG. 10 illustrates a graph representation of the sequence of postures addressing the task comprising two alternative branches in an implementation of the invention.

In particular, FIG. 10 depicts a graph representation of the sequence of postures with a decision point between step 2 and step 3. Extending beyond the exemplary sequence of postures shown in FIGS. 8A to 8D, which illustrate a coupling between steps in a linear sequence of postures from step 1 to step 7, the present invention is not limited to this linear sequence of postures. The same basic concept can also be applied to tasks that have a graph structure.

A task having a graph structure may, for example, realize addressing the task objective using two or more different options.

FIG. 10 illustrates the graph structure for a directed acyclic graph. As depicted in FIG. 10, after step 2, the task can be realized by either proceeding with rotating the object clock-wise in a first option, or by rotating the object counter-clockwise in an alternative second option.

The first option is displayed in the upper branch of FIG. 10. The second option is displayed in the lower branch of FIG. 10.

After step 6, both the first and the second option merge to the final step 7 again, which is the same step 7 for both options. Modelling several options permits a variety of application cases for embodiments of the invention.

For example, the pose in step 2 of the sequence of postures can be computed such that both the first option and the second option can be pursued as equally optimal.

Alternatively, the first and second options can each be weighted according to their quality.

Yet alternatively, the first and the second option may simply be selected.

FIG. 10 shows an example of a sequence of postures, which branches at the decision point of step S2 into two options. It is evident, that the concept may be extended to more than two options and to sequences of postures with more than one decision point.

In an embodiment, a user may perform the weighting of options or the selecting of options interactively via a user interface provided by a computer program.

Embodiments of the method may be applied in areas of robotics, for instance for simulating sequential assembly tasks and shared autonomy tasks with human guidance. More specifically, the method enables real-time robot motion planning for handling, manipulating and transporting objects. The method provides planning contacts for robot location and end-effector placement, as well as planning a sequence of object poses to achieve the given task objective. The invention also allows to find optimal solutions how a robot 2 grips a tool as specific example for the object 3.

The method enables to determine optimal motions for robot-robot cooperative tasks, such as hand-over of tools or work pieces. Therefore the method may be advantageously applied in the field of multi-robot planning.

The method is not limited to the field of robotics, but enables to perform realistic computer animation and simulation of kinematic movement of virtual characters and structural objects. The virtual characters may be animated how to perform a sequence of object manipulation steps. Creating training videos, in augmented reality/virtual reality environments, in interactive workspace design software, and in computer games is supported by the method.

The virtual characters may be employed as training examples how a human advantageously performs the task. For example, in sport and home computer games, the method supports players in identifying a sequence of postures (moves), for instance which handholds to use in a wall-climbing game, or how to set feet and hands in the twister game. In a factory setting, the sequence of postures describing how to grasp and re-grasp the object 3, e.g. a heavy car door to be mounted onto a hinge arranged at a chassis can be determined and shown to a worker undergoing training using AR/VR technologies. Similarly, an optimized support surface for addressing tasks that require leaning over large items while performing the task can be visualized to a trainee.

Changing an underlying criteria function, e.g. a load function describing a load on a human spine supports understanding which posture should be avoided, and which posture is suited when addressing the task. This can be utilized in training animations to show the difference between suitable and less suitable ways to perform the task.

The effect of applying the method for arranging elements and objects 3 in a work cell, and their immediate effect on the way a worker needs to move for addressing the task, allow designers to better learn and understand the relation of their designs to the worker's ergonomics. This can be animated directly in a computer program and displayed visually, or output using the VR/AR device 12. Alternatively or additionally, computer-aided design tools including embodiments may be equipped with a slider corresponding to a criteria function, e.g. a human ergonomic criteria function. The slider is an advantageous input tool illustrating how the design of the work environment changes with respect to the chosen criteria. The method enables human-centered motion planning in an advantageous manner. Given an ergonomic model of a human collaboration partner, the method adjusts end-effector postures and object poses in order to match a quality function that comprises an ergonomic state of the human. The robot 2 may, for instance, adjust the object pose for an ergonomically optimal hand-over to a human based on the results of the method.

In the field of human-centered motion simulation and planning, the concept of the method enables incorporating a model of a human 2' into the algorithm. The model of the human can, for example include a bio-mechanic description, a kinematic model or an ergonomic state of the human 2'. Starting from the model of the human, the method proceeds by modelling an interaction with the human using the sequential constraint concept of the method. Applying the method enables adjusting hand- and object poses of the robot 2 in order to match a quality function that comprises human-centered quantities. Particular examples include adjusting the object pose in a human-robot handover task for an ergonomically optimized hand-over to the human 2', determining how to hold the hand of a human 2' that is to be dressed assisted by the robot 2, while pulling over a sleeve over an arm of the human 2', in the application area of robot-assisted dressing, tasks including human-robot collaborative manipulation of large objects 3, e.g. boxes, the concept enables to find a sequence of object poses that reduce loads on the spine of the human 2', leading to reduced lower back injuries, and optimizing physical support systems that aid elderly or handicapped humans 2' to get up from a lying or sitting pose, the method may be applied to determine a spatial effector location for offering a supporting hand hold, and how to move the effector 8 so that the patient is supported optimally with respect to his or her physical abilities and ergonomics condition.

Optimizing a location of the robot 2 based on accompanying simulations of a predefined task. The method may determine the optimized location from a description of the task, by simulating the steps to address the task, and performing constraint relaxation of the constraint on the location of the robot 2. Thus, the method allows to find an optimized location of the robot 2 with respect to the task.

The method may be employed to simulate the given task using different types of robots 2 in order to determine, which type of robot 2 is most suited for performing the given task.

A further advantageous application area for the method is in work-place design based on simulations applying the method. For example, the method is used as a computer program to design the work-place within a factory environment. Starting from a given description of the task, the method may simulate the steps to address the task. In particular, the method performs constraint relaxation of the constraint on the location of the tools and physical objects 3 related to the task according to the description. Applying the method results in determining optimized locations of the required tools and objects 3 required for the performing the task.

The method may be advantageously applied for finding optimal motions for perturbations in a task. The method determines optimized solutions for problems, in which exact coordinates of end-effectors 9 and objects 3 involved in the task are unknown, or the coordinates vary to certain degree. The method addresses this particular problem by adding perturbations of the task as additional sequences of postures to the overall model of the task, and to optimize the overall perturbations as one ensemble. A particular example is the "grip-in-the-box"-problem, in which a robot 2 is required to grasp objects 3 from different locations out of a box.

A particular advantageous application area of the method is predictive decision making. The sequence of postures (linear sequence) discussed in the embodiment may be extended to a concept of a tree-like structure. Each branch of a tree represents an alternate option. The tree separates at a decision point into separate branches, wherein each branch corresponds to one of a number of alternate options. This has been discussed with regard to FIG. 10 as option 1 of "turning the object left" vs. option 2 of "turning the object right". The method allows without any extension modelling such tree topologies, which makes the method unique and advantageous with respect to the traditional trajectory optimization algorithms. Potential applications include applying the method in online receding horizon motion planning. In this particular example, a motion can be computed such that it is optimized with respect to one option or the other option, or a weighted average of all possible options at a same time. Thus, decision making for option 1 or option 2 bases on computed criteria.

The embodiment of the invention focuses on examples characterized by a sequence of postures with linear structure. However, extending the concept of a linear sequence to a tree structure including two or more branches provides further advantageous embodiments. The cost function corresponding to each branch may be weighted so that a contribution of the cost function of each individual branch to the overall cost function can be modulated. Weighting both options in a tree structure with two branches equally will result in a sequence of postures that is optimized with respect to both options. This results in determining motions that allow to take a decision for one of the two branches, therefore for one out of the two options, as late as possible.

Provided that some measure of which one of the alternate options is more likely is known, the options may be weighted according to their respective likelihood. If, for instance, in known cases, the left effector has been preferred over the right effector when grasping the object 3 with a ratio of 80% to 20%, the known ratio may be used to modulate both options accordingly.

Using the same model, the sequence of postures may be computed using the first option only, and then second option only. Subsequently, the computed results may be compared, and a decision for one of the first and the second option can be taken based on a comparison of the cost functions for both options.

In case there exists a large number of possible alternate options, a weighting of the alternate options can be included into an optimization problem, providing solutions that are void of the options with the least quality, and maintain the options which are most promising.

The method may be applied in in-hand manipulation of objects. Given an initial contact sequence in the initial sequence of postures, the method enables determining optimized contact sequences for an in-hand object manipulation task.

The method is applicable to tasks such as object transportation or object manipulation with an unknown number of re-grasps by the effectors 8. In case the number of re-grasps or contact changes is unknown, the method may be applied to compute several sequences of postures, each sequence with a different number of postures (steps), and to determine the minimum number of postures by rejecting all computed sequences that deliver motions leading to a violation of at least one physical limit of the robot 2.

In the area of multi-contact locomotion of a mobile robot 2, the method may be applied to optimize multi-limb locomotion patterns for a humanoid robot 2 or a multi-legged robot 2.

The method of present invention enables to control the robot 2, in particular at least one effector trajectory of at least one effector 8 of the robot 2. Controlling the effector trajectory has effects (physical effects) in the real world, for example in changes of spatial coordinates of the at least one effector 8 and therefore movement of the at least one effector 8 in the real world, which can be expressed in physical parameters. The robustness of robot control may be improved, a power consumption of the robot 2 may be reduced and the robot 2 operates more efficient. The computational effort for computing the at least one effector trajectory is advantageously reduced when applying the method. The method is advantageously fast and therefore well suited for online and real-time application, and thus in a robotic system 1 controlled according to the principle of receding horizon control.

What is claimed is:

1. A method for controlling at least one effector trajectory of a robot for solving a predefined task by at least one virtual effector, the method comprising:
   acquiring a sequence of postures, each posture including at least one contact point and a kinematic pose of the at least one virtual effector;
   modifying at least one of a contact constraint topology and an object constraint topology according to the acquired sequence of postures,
   wherein modifying the contact constraint topology comprises:
   in case a contact location in an object frame of a current posture in the sequence of postures remains the same as a contact location of the corresponding contact in an immediately preceding posture of the sequence of postures;
   removing a constraint of the contact to the object in the current posture; and
   connecting a new constraint of the contact in the current posture to the corresponding contact in at least one immediately preceding posture of the sequence of postures; and
   wherein modifying the object constraint topology comprises:
   in case an object pose of the current posture in the sequence of postures remains the same as the object pose in an immediately preceding posture of the sequence of postures;
   removing a constraint of the object in the current posture; and
   connecting a new constraint of the object in the current posture to the corresponding object in at least one immediately preceding posture of the sequence of postures; and
   generating a set of constraint equations based on at least one of the modified contact constraint topology and the modified object constraint topology;
   performing constraint relaxation on the generated set of constraint equations to generate a task description including the relaxed set of constraint equations;
   generating the at least one effector trajectory by applying a trajectory generation algorithm on the generated task description;
   generating a control signal by performing an inverse kinematics algorithm on the generated at least one effector trajectory;
   outputting the generated control signal to an output device;
   generating, by the output device, image information displaying the at least one effector trajectory of the virtual effector based on the control signal; and
   controlling at least one effector of the robot based on the generated at least one effector trajectory.

2. The method for controlling at least one effector trajectory according to claim 1, wherein performing constraint relaxation on the generated set of modified constraint equations comprises at least one of:
   regularizing at least one individual constraint by allowing a deviation from the individual constraint;
   removing at least one constraint which is invariant for the task; and removing at least one constraint in case a constraint coordinate thereof is within a predetermined interval.

3. The method for controlling at least one effector trajectory according to claim 1, wherein
   each contact point is modelled in a kinematic chain in an environment via an object coordinate frame of an object in the environment.

4. The method for controlling at least one effector trajectory according to claim 1, wherein the method further comprises:
   generating and outputting, via a user interface, a video sequence configured to display the at least one trajectory.

5. The method for controlling at least one effector trajectory according to claim 1, wherein in the step of performing the constraint relaxation on the generated set of constraint equations, at least a constraint equation on at least one location of a tool or object required for solving the task is relaxed, and the method further comprises:
  determining at least one optimized location of the tool or object for designing a workplace within an environment for performing the predefined task.

6. The method for controlling at least one effector trajectory according to claim 1, wherein the method further comprises:
  varying a cost function;
  generating differing effector trajectories by executing the method for the varied cost function; and
  computing a criteria function for each generated effector trajectory.

7. The method for controlling at least one effector trajectory according to claim 6, wherein
  the criteria function corresponds to a human ergonomic function.

8. The method for controlling at least one effector trajectory according to claim 6, wherein the method further comprises:
  outputting, via a user interface, at least one value for a parameter of the criteria function.

9. A non-transitory computer-readable storage medium embodying a program of machine-readable instructions executable by a digital processing apparatus that cause the digital processing apparatus to perform operations according to claim 1.

10. A simulation system for controlling at least one effector trajectory of a robot for solving a predefined task by at least one virtual effector, the simulation system comprising:
  an acquisition unit configured to acquire a sequence of postures, each posture including at least one contact point and a kinematic pose of the at least one virtual effector;
  a processor configured to:
    modify at least one of a contact constraint topology and an object constraint topology according to the acquired sequence of postures,
      wherein modifying the contact constraint topology comprises:
        in case a contact location in an object frame of a current posture in the sequence of postures remains the same as a contact location of the corresponding contact in an immediately preceding posture of the sequence of postures;
        removing a constraint of the contact to the object in the current posture; and
        connecting a new constraint of the contact in the current posture to the corresponding contact in at least one immediately preceding posture of the sequence of postures, and
      wherein modifying the object constraint topology comprises:
        in case an object pose of the current posture in the sequence of postures remains the same as the object pose in an immediately preceding posture of the sequence of postures;
        removing a constraint of the object in the current posture; and
        connecting a new constraint of the object in the current posture to the corresponding object in at least one immediately preceding posture of the sequence of postures;
    generate a set of constraint equations based on at least one of the modified contact constraint topology and the modified object constraint topology;
    perform constraint relaxation on the generated set of constraint equations to generate a task description including the relaxed set of constraint equations;
    generate the at least one effector trajectory by applying a trajectory generation algorithm on the generated task description based on a cost function;
    generate a control signal by performing an inverse kinematics algorithm on the generated at least one effector trajectory; and
    output the generated control signal to an output controller of the simulation system; and
  the output controller, configured to:
    control output of image information displaying the at least one effector trajectory of the virtual effector by a display device based on the control signal; and
    control at least one effector of the robot based on the generated at least one effector trajectory.

11. The simulation system according to claim 10, wherein the simulation system further comprises:
  the display device, wherein the display device is configured to display a video sequence displaying the at least one trajectory.

12. The simulation system according to claim 10, wherein the display device displays the video sequence displaying the at least one trajectory via an augmented reality display or a virtual reality display.

13. A method for controlling at least one effector trajectory of a robot for solving a predefined task by at least one virtual effector, the method comprising:
  acquiring a sequence of postures, each posture including at least one contact point and a kinematic pose of the at least one virtual effector;
  modifying at least one of a contact constraint topology and an object constraint topology according to the acquired sequence of postures;
  generating a set of constraint equations based on at least one of the modified contact constraint topology and the modified object constraint topology;
  performing constraint relaxation on the generated set of constraint equations to generate a task description including the relaxed set of constraint equations, wherein in performing the constraint relaxation on the generated set of constraint equations, at least a constraint equation on at least one location of a tool or object required for solving the task is relaxed;
  determining at least one optimized location of the tool or object for designing a workplace within an environment for performing the predefined task;
  generating the at least one effector trajectory by applying a trajectory generation algorithm on the generated task description;
  generating a control signal by performing an inverse kinematics algorithm on the generated at least one effector trajectory;
  outputting the generated control signal to an output device;
  generating, by the output device, image information displaying the at least one effector trajectory of the virtual effector based on the control signal; and
  controlling at least one effector of the robot based on the generated at least one effector trajectory.

14. A simulation system for controlling at least one effector trajectory of a robot for solving a predefined task by at least one virtual effector, the simulation system comprising:

an acquisition unit configured to acquire a sequence of postures, each posture including at least one contact point and a kinematic pose of the at least one virtual effector;

a processor configured to:

modify at least one of a contact constraint topology and an object constraint topology according to the acquired sequence of postures;

generate a set of constraint equations based on at least one of the modified contact constraint topology and the modified object constraint topology;

perform constraint relaxation on the generated set of constraint equations to generate a task description including the relaxed set of constraint equations, wherein in performing the constraint relaxation on the generated set of constraint equations, at least a constraint equation on at least one location of a tool or object required for solving the task is relaxed;

determine at least one optimized location of the tool or object for designing a workplace within an environment for performing the predefined task;

generate the at least one effector trajectory by applying a trajectory generation algorithm on the generated task description based on a cost function;

generate a control signal by performing an inverse kinematics algorithm on the generated at least one effector trajectory; and output the generated control signal to an output controller of the simulation system; and the output controller, configured to:

control output of image information displaying the at least one effector trajectory of the virtual effector by a display device based on the control signal; and control at least one effector of the robot based on the generated at least one effector trajectory.

* * * * *